United States Patent [19]

Copple et al.

[11] Patent Number: 5,127,254

[45] Date of Patent: Jul. 7, 1992

[54] METHOD AND APPARATUS FOR SPLIT SLEEVE COLD EXPANSION OF OPENINGS IN STRUCTURAL MEMBERS

[75] Inventors: Charles M. Copple, Kent; Michael A. Landy, Bellevue; Richard Jarzebowicz, Kirkland; Leonard F. Reid, Bellevue; Eric T. Easterbrook, Kent; Mark Weiss, Seattle, all of Wash.

[73] Assignee: Fatigue Technology, Inc., Seattle, Wash.

[21] Appl. No.: 728,195

[22] Filed: Jul. 10, 1991

[51] Int. Cl.$^5$ .................................. B21D 39/08
[52] U.S. Cl. .................................. 72/370; 72/392
[58] Field of Search ............. 72/370, 391.2, 392, 72/393, 479

[56] References Cited

U.S. PATENT DOCUMENTS

| | | | |
|---|---|---|---|
| 3,566,662 | 3/1971 | Champoux | 72/370 |
| 3,892,121 | 7/1975 | Champoux et al. | 72/393 |
| 4,164,807 | 8/1979 | King, Jr. | 29/523 |
| 4,187,708 | 2/1980 | Champoux | 72/30 |
| 4,423,619 | 1/1984 | Champoux | 72/393 |
| 4,425,780 | 1/1984 | Champoux | 72/370 |
| 4,471,643 | 9/1984 | Champoux et al. | 72/391 |
| 4,524,600 | 6/1985 | Champoux et al. | 72/391 |
| 4,557,033 | 12/1985 | Champoux | 29/525 |
| 4,583,388 | 4/1986 | Hogenhout | 72/393 |

OTHER PUBLICATIONS

Paper entitled "Fatigue Improvement by Sleeve Coldworking" by Joseph L. Phillips, Society of Automotive Engineers, Inc., National Aerospace Engineering and Manufacturing Meeting Los Angeles, Calif. Oct. 16-18, 1973.

Primary Examiner—Lowell A. Larson
Attorney, Agent, or Firm—Delbert J. Barnard

[57] ABSTRACT

A split sleeve (S) is deposited into a sleeve loader (24, 24'), with a lower end of the sleeve (S) on a sleeve support surface (154). A mandrel (M) carried by a puller tool (10, 10') is inserted into the sleeve loader (24, 24'), and through the sleeve (S), to position the sleeve (S) on a small diameter portion (50) of the mandrel (M), and an end portion of the sleeve (S) within a nosepiece (12), against a sleeve end contacting surface (66). The tool (10, 10') is moved away from the sleeve loader (24, 24') to pull the mandrel (M) out from the sleeve loader (24, 24'). Then the mandrel (M) is inserted into an opening (16) in a workpiece (14). The tool (10, 10') is moved endwise to place the sleeve (S) within the opening (16) and a workpiece contacting end surface of the nosepiece (12) into contact with the workpiece (14). The tool (10, 10') is then operated to retract the mandrel (M). This moves first an increasing diameter portion (52) and then a maximum diameter portion (54) of the mandrel (M) axially through the sleeve (S). In response, the sleeve (S) is expanded radially to compress the material immediately surrounding the opening. Grip surfaces (158) on end portions of nosepiece fingers (78) grip the sleeve (S). Following retraction, the tool (10, 10') is moved away from the workpiece (14) and the sleeve (S) is pulled out from the opening (16).

27 Claims, 12 Drawing Sheets

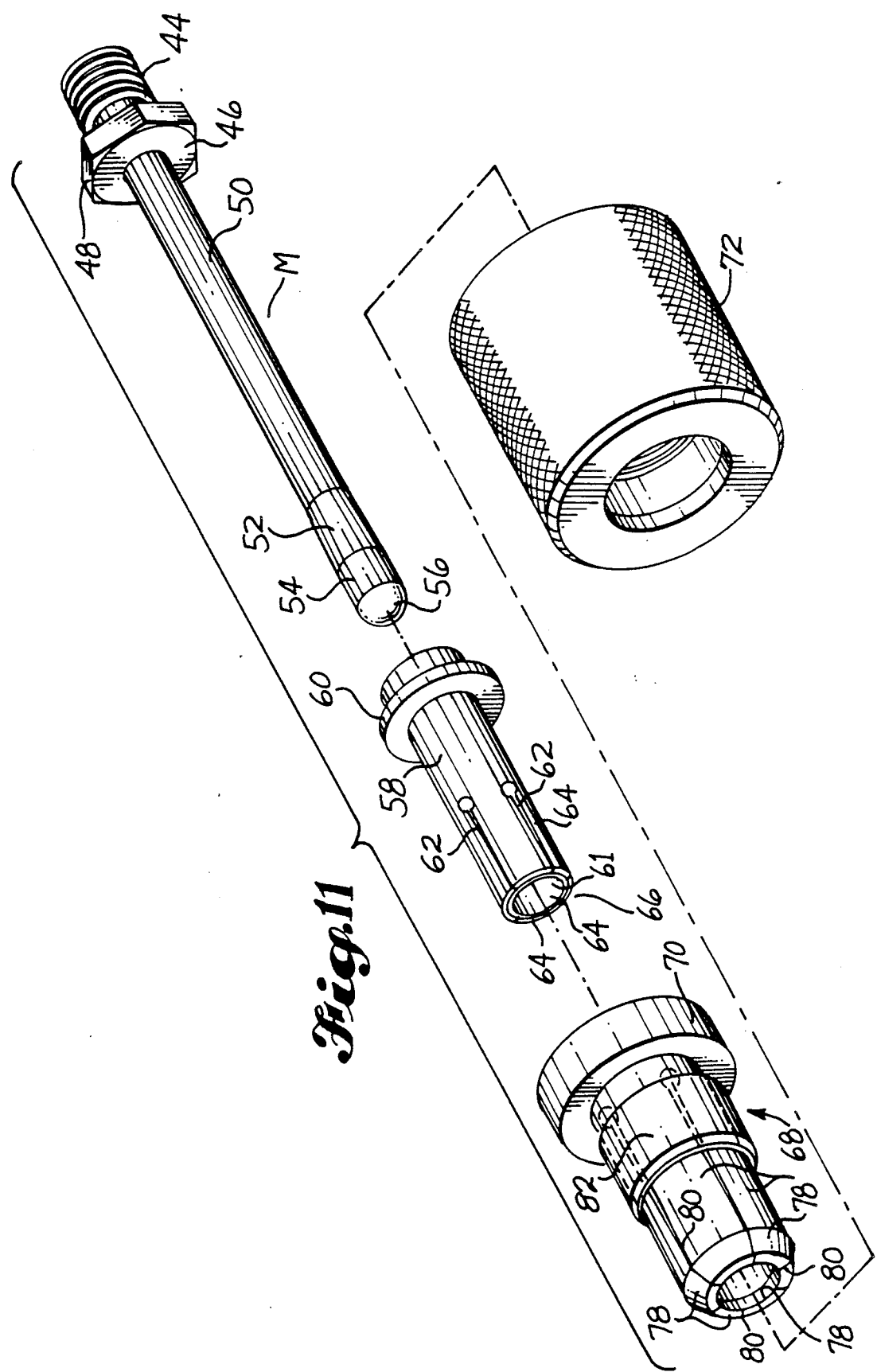

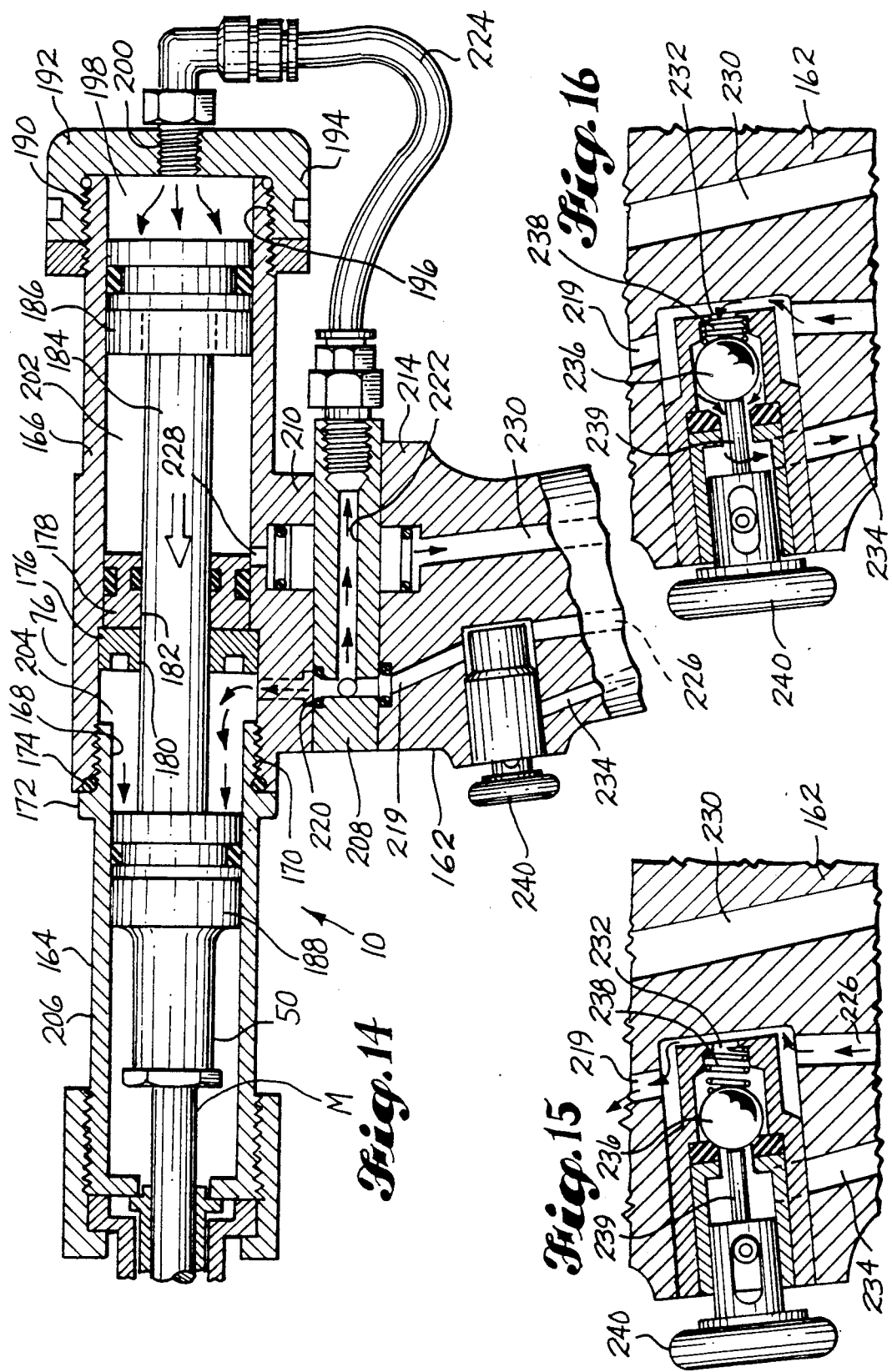

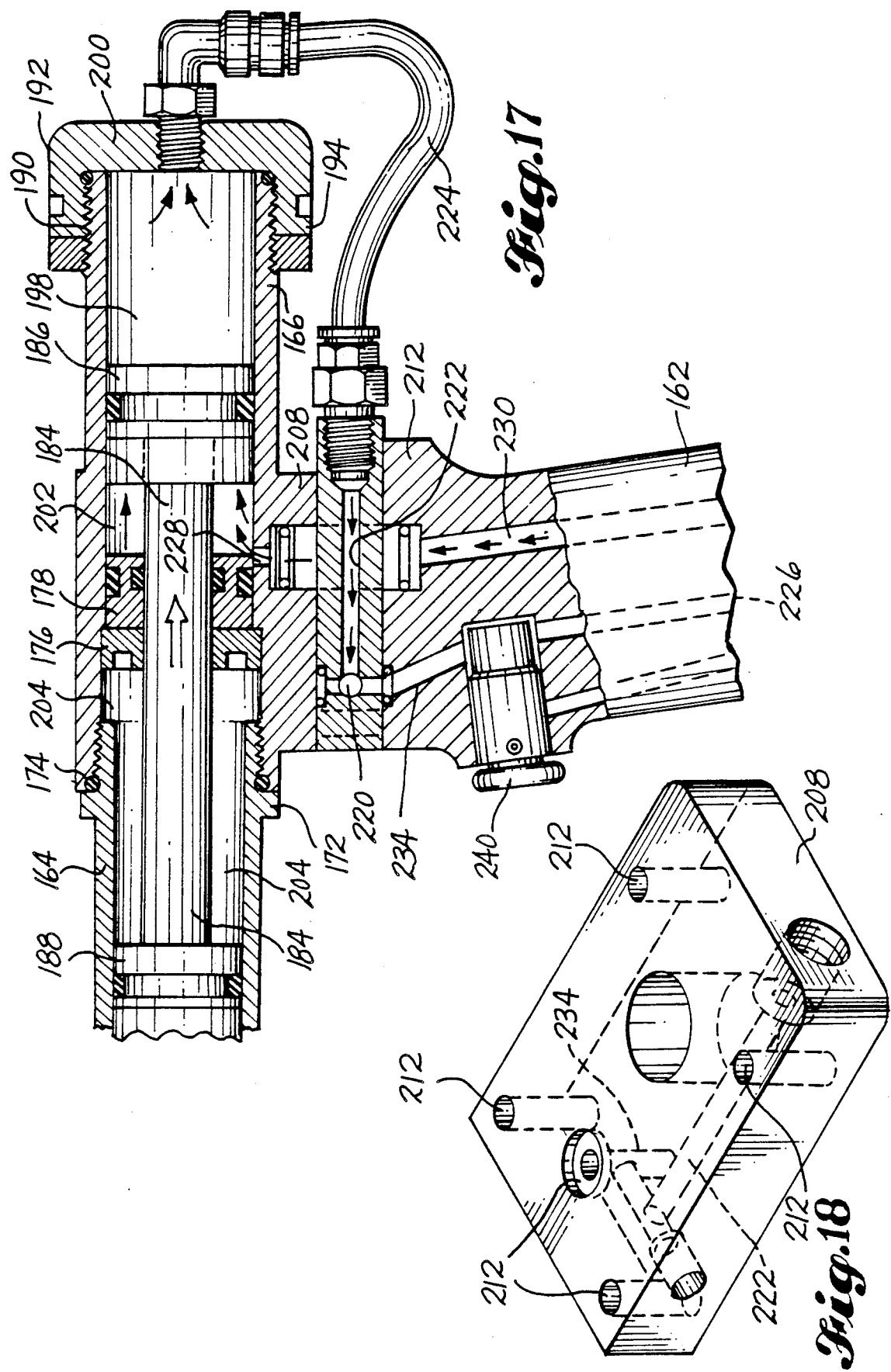

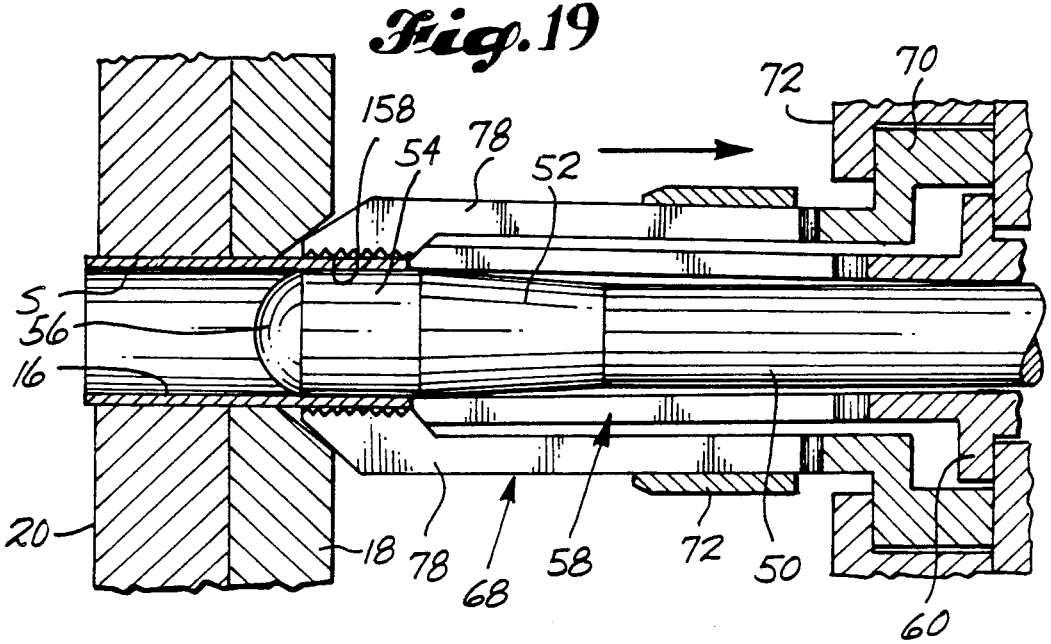
*Fig.19*
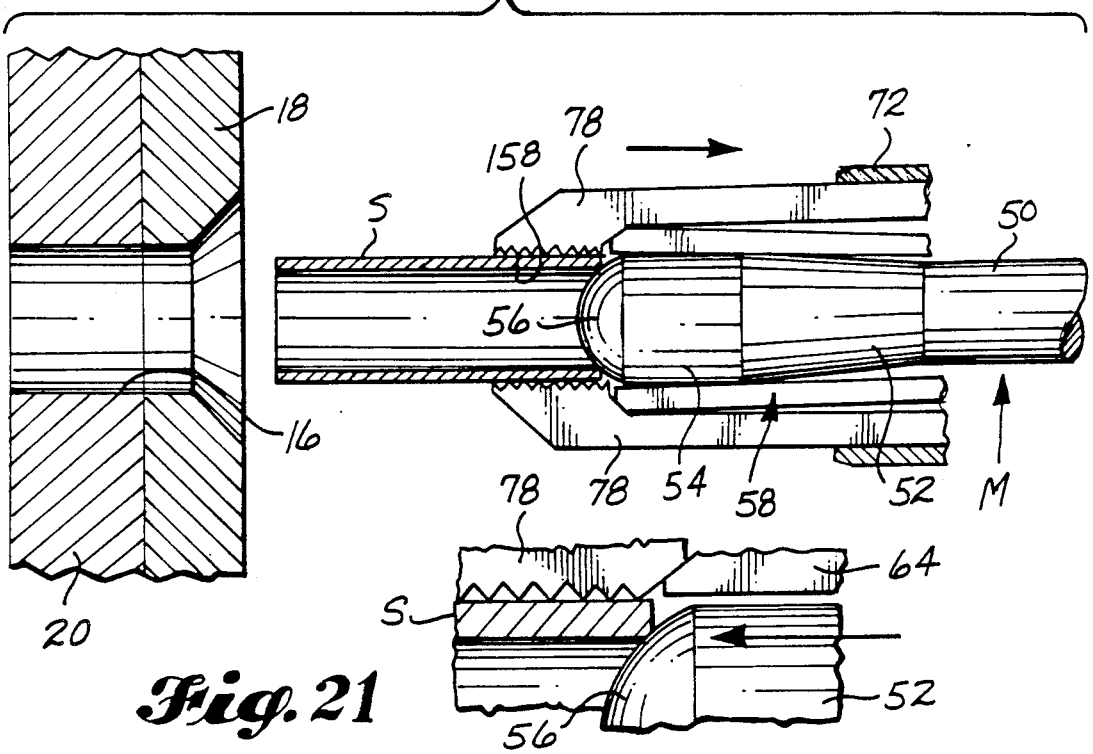
*Fig.20*
*Fig.21*

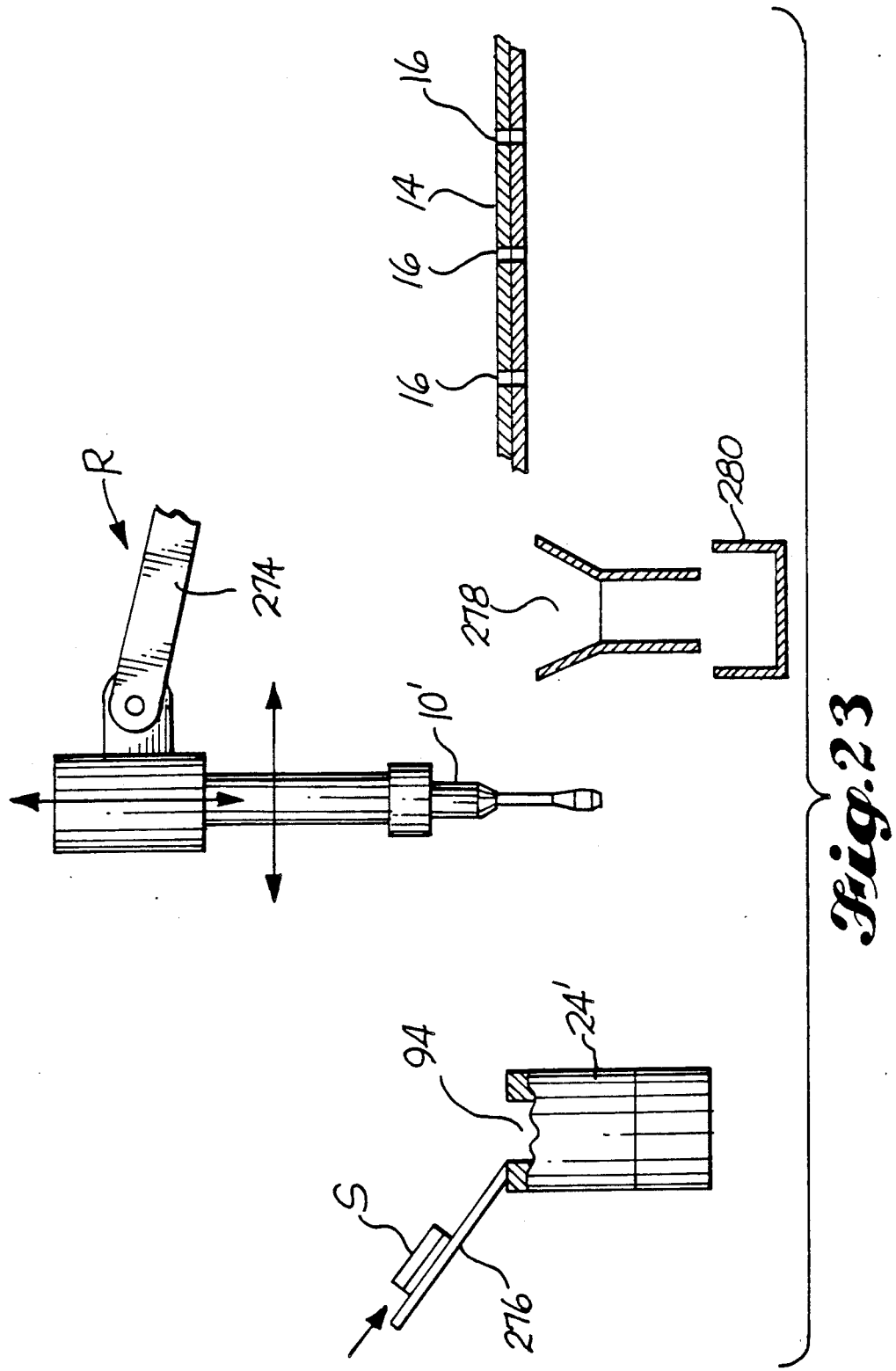

METHOD AND APPARATUS FOR SPLIT SLEEVE COLD EXPANSION OF OPENINGS IN STRUCTURAL MEMBERS

DESCRIPTION

1. Technical Field

This invention relates to split sleeve cold expansion of fastener holes and the like. More particularly, it relates to the provision of a method and apparatus for quickly and easily installing a split sleeve on a mandrel, prior to cold expansion, and quickly and easily removing the sleeve from the fastener hole, following cold expansion.

2. Background Information

Split sleeve cold expansion of fastener holes and other openings in structural members is a process in which a tapered mandrel is used in conjunction with a disposable, prelubricated split sleeve to compressively prestress a significant zone in the material around the opening. This compressive prestressing offsets the stress concentration of the hole itself to produce substantial improvement in structural fatigue performance of the material in which the opening is formed.

Split sleeve cold expansion process is most often performed from one side of the workpiece. The mandrel has an inner end which is connected to a piston within a puller tool. Starting from the inner end, the mandrel includes in series, a small diameter portion, an increasing diameter portion and a maximum diameter portion. The piston is retractable to retract the mandrel and extendible to extend the mandrel. A split sleeve is moved endwise over the maximum and increasing diameter portions of the mandrel, and onto the small diameter portion of the mandrel. The split in the sleeve allows the sleeve to expand as it is moved relatively over the maximum and increasing diameter portions of the mandrel. When the sleeve is on the small diameter portion of the mandrel it is contracted and has an outside diameter equal to or slightly smaller than the maximum diameter portion of the mandrel. The maximum diameter portion of the mandrel is sized to fit through a workpiece opening that is to be expanded. The split sleeve, while in a contracted position on the small diameter portion of the mandrel, is also fittable through the workpiece opening.

As a first step of the cold expansion method, as it has been practiced to date, a split sleeve is installed onto the small diameter portion of the mandrel. Then, the maximum diameter portion of the mandrel is aligned with the opening. Then, the puller tool is moved endwise to move first the maximum diameter portion and then the increasing diameter portion of the mandrel through the opening. This endwise movement of the puller tool is continued until the split sleeve is within the opening and a nosepiece on the puller tool is against the workpiece. The puller tool is then operated to retract the piston and the mandrel. Movement of first the increasing diameter portion and then the maximum diameter portion of the mandrel through the split sleeve causes another expansion of the split sleeve. The split sleeve thickness is significantly greater than the clearance between the maximum diameter portion of the mandrel and the wall of the workpiece opening. As a result, movement of the increasing and maximum diameter portions of the mandrel through the split sleeve imposes on the split sleeve a radially outward force which acts on the workpiece material immediately surrounding the opening and increases the diameter of the opening. The diameter of the opening is increased a sufficient amount to introduce a compressive hoop prestress into the material surrounding the opening. The puller tool is operated to pull the mandrel completely through the split sleeve. Then, the puller tool is hand pulled by the operator away from the workpiece while the split sleeve remains in the opening In the past, the split sleeves were placed on the mandrel by hand. The user or operator simply pushed a sleeve over the maximum diameter portion of the mandrel and then moved the sleeve along the mandrel until it was properly positioned on the small diameter portion of the mandrel. After cold expansion, and after movement of the puller tool and mandrel away from the workpiece, the sleeve was removed from the opening as an additional step. A principal object of the present invention is to provide a method and apparatus for facilitating the placement of a split sleeve onto the mandrel, prior to coldworking, and for automatically removing the sleeve from the opening following cold expansion when the puller tool and mandrel are pulled away from the workpiece.

The prior art process and tooling are described in detail in Louis A. Champoux U.S. Pat. No. 3,566,662, granted Mar. 2, 1971; Louis A. Champoux U.S. Pat. No. 4,187,708, granted Feb. 12, 1980; and Louis A. Champoux U.S. Pat. No. 4,425,780, granted Jan. 17, 1984, Franciscus Hogenhout U.S. Pat. No. 4,583,388, granted Apr. 22, 1986, discloses a puller tool for a split mandrel. The above patents, and the following additional U.S. patents should be considered for the purpose of putting the invention into proper perspective relative to the prior art. Louis A. Champoux, Horace E. Hill, and Joseph L. Phillips U.S. Pat. No. 3,892,121, granted Jul. 1, 1975; Louis A. Champoux U.S. Pat. No. 4,423,619, granted Jan. 3, 1984; Robert L. Champoux and Charles M. Copple U.S. Pat. No. 4,471,643, granted Sept. 18, 1984; Robert L. Champoux and Charles M. Copple U.S. Pat. No 4,524,600, granted Jun. 25, 1985; and Robert L. Champoux U.S. No. 4,557,033, granted Dec. 10, 1985.

DISCLOSURE OF THE INVENTION

One aspect of the invention is to provide a sleeve loader for facilitating installation of a split sleeve onto a mandrel that is to be used with such sleeve to expand an opening in a workpiece. The sleeve loader is basically characterized by a housing and an elongated mandrel receiving passageway in said housing. Such passageway includes an end opening through which the mandrel is inserted into and moved out from the passageway. The mandrel receiving passageway is in part defined by a sleeve support within the housing, spaced axially inwardly of the end opening. The sleeve support is expandable and retractable radially and includes a central mandrel receiving opening that is surrounded by an end surface. The end surface is directed axially outwardly towards the end opening of the mandrel receiving passageway. In use, an elongated split sleeve is inserted into the end opening of the mandrel receiving passageway, into a supported position on the end surface of the sleeve support. The mandrel is then inserted into the mandrel receiving passageway, and moved to and through the split sleeve. The large diameter end portion of the mandrel is sized to expand the sleeve as it moves through the sleeve and to expand the sleeve holder as it moves through the sleeve holder. The mandrel receiving passageway is long enough to permit insertion of the mandrel into the passageway a sufficient distance to move the large end portion of the mandrel entirely through the split sleeve and place the split sleeve on the small diameter portion of the mandrel. Once the sleeve is properly positioned on the small diameter portion of the mandrel, the mandrel is withdrawn from the loader. As the mandrel moves out from the mandrel receiving passageway the sleeve support is again expanded radially by its contact with the large diameter end portion of the mandrel, enabling the large diameter portion of the mandrel to move back through the tool support.

In preferred form, the housing includes a tubular main body and the sleeve support is a ring member positioned within the main body. The sleeve support is divided axially into a plurality of segments. An elastic band extends circumferentially about the sleeve support and holds the segments together to form the ring. The elastic band allows the segments to move radially outwardly and circumferentially apart as the large diameter end portion of the mandrel is moved through the central mandrel receiving opening.

Also in preferred form, at least one spacer ring is located within the tubular main body, axially inwardly of the sleeve support. At least one other spacer ring is located within the tubular main body axially outwardly of the sleeve support. Each spacer ring includes a central opening which is a part of the mandrel receiving passageway. Each central opening is larger in diameter than the large diameter end portion of the mandrel. The spacer rings differ in length. The order of placement of the sleeve support and the spacer rings within the housing is changeable for the purpose of changing the distance that the sleeve support is faced from the end opening in the mandrel receiving passageway. The sleeve support position is changed to accommodate different sleeve lengths in the housing. This is an important and significant feature of the invention.

According to an aspect of the invention, one of the spacer rings includes an end socket in which the sleeve support is received. The end socket has an interior diameter that is larger than the exterior diameter of the sleeve support. This arrangement provides, when the segments of the sleeve support are in contact, an annular space about the sleeve support into which the segments can move when the large diameter end portion of the mandrel is moved through the central mandrel receiving opening.

According to another aspect of the invention, a support is provided for the sleeve loader. The support may be connected to a user and it positions the sleeve loader in convenient reach of the user, with the end opening of the mandrel receiving passageway directed upwardly. In preferred form, the support includes a user engaging strap (e.g. a belt and/or a shoulder harness) and a pocket secured to said strap in which the sleeve loader housing is located. A second pocket may be provided for receiving used sleeves. A third pocket may be provided for holding sleeves which have not yet been used.

A further aspect of the invention is to provide a puller tool that is adapted to remove the split sleeve from the opening in the workpiece as the tool is moved away from the workpiece, following cold expansion. In preferred form, the puller tool includes a housing and an extendable/retractable piston within the housing. The inner end portion of the mandrel is connected to the piston so that extension and retraction of the piston will extend and retract the mandrel. The puller tool also includes an elongated, expandable sleeve holder having a central passageway in which the mandrel is received.

The sleeve holder has a sleeve end contacting outer end and an inner end that is within the housing. An elongated, axially split, expandable nosepiece surrounds the sleeve holder. The nosepiece comprises a plurality of axially extending fingers separated by axially extending splits. The fingers include outer end portions which extend axially outwardly from the sleeve contacting end of the sleeve holder. The fingers also include workpiece contacting end surface and together the sleeves define a sleeve receiving space. In use, a split sleeve is installed onto the small diameter portion of the mandrel, when the mandrel is extended. The sleeve is moved along the mandrel into the sleeve receiving space in the nosepiece, and against the sleeve end contacting outer end of the sleeve holder. Then the mandrel and sleeve are inserted into the workpiece opening and are moved endwise to place the split sleeve in the workpiece opening and the workpiece contacting surfaces of the nosepiece into contact with the workpiece. Then, the piston is retracted to retract the mandrel and pull it completely through the split sleeve. As the mandrel retracts, the increasing diameter and maximum diameter portions of the mandrel move through the split sleeve, expanding the split sleeve against the sidewall of the opening. The expanding split sleeve exerts a radially outwardly directed force on the workpiece material immediately surrounding the workpiece opening. According to the invention, the outer end portions of the fingers have radially inwardly directed grip surfaces which outwardly bound the sleeve receiving space in the nosepiece. The grip surfaces grip the split sleeve. At the end of cold expansion, when the mandrel is retracted, the grip surfaces hold onto the split sleeve while the puller tool and the mandrel are moved away from the workpiece. Thus, movement of the puller tool and mandrel away from the workpiece will pull the split sleeve out from the opening in the workpiece.

In the preferred embodiment, the nosepiece fingers are in the nature of leaf springs which normally bias the grip surfaces of the fingers into gripping contact with the split sleeve. The nosepiece fingers include inwardly directed cam surfaces. The sleeve holder is movable axially outwardly against the cam surfaces by an operator control of the puller tool. As the sleeve holder moves outwardly it contacts the cam surfaces on the nosepiece fingers and exerts a radially outwardly directed force on the nosepiece fingers. This radially outwardly directed force moves the grip surfaces out of gripping engagement with the sleeve, allowing the sleeve to become disengaged from the puller tool.

Other objects, features and advantages of the invention will be hereinafter described in the description of the best mode.

BRIEF DESCRIPTION OF THE DRAWINGS

In the drawings, like reference numerals and letters refer to like parts throughout the several views, and:

FIG. 11 is an exploded pictorial view of the mandrel and the nosepiece assembly;

FIG. 14 is an axial sectional view of the puller tool, with a portion of the nosepiece assembly and a portion of the handle omitted, such view showing air being delivered into the barrel of the puller tool, for extending a piston within said barrel to which the mandrel is connected;

FIG. 15 is an enlarged scale fragmentary sectional view in the trigger region, showing the trigger valve closed;

FIG. 16 is a view like FIG. 15, showing the trigger valve open;

FIG. 17 is a view like FIG. 14, but showing the delivery of oil into the working chambers of the puller gun, to retract the piston and the mandrel;

FIG. 18 is a pictorial view of an adapter block that is positioned between the handle and barrel portions of the puller tool;

FIG. 19 is an enlarged scale axial sectional view taken through the nosepiece assembly of the puller gun, showing the mandrel being pulled through the split sleeve;

FIG. 20 is a view like FIG. 19, but showing the nosepiece assembly being moved away from the workpiece, and showing the sleeve being gripped by grip surfaces on inner surface portions of the nosepiece fingers, and being moved out from the opening in the workpiece as the puller tool is moved away from the workpiece; and FIG. 21 is an enlarged scale sectional view in the region of contact between the front end of the mandrel and the rear end of a sleeve which is being ejected by an extension of the mandrel.

FIG. 23 is a schematic diagram of a completely automatic system, in which the puller tool is controlled by a robot.

BEST MODE FOR CARRYING OUT THE INVENTION

The tooling of the invention will first be described. Then, the method of the invention will be described.

Figure 1:
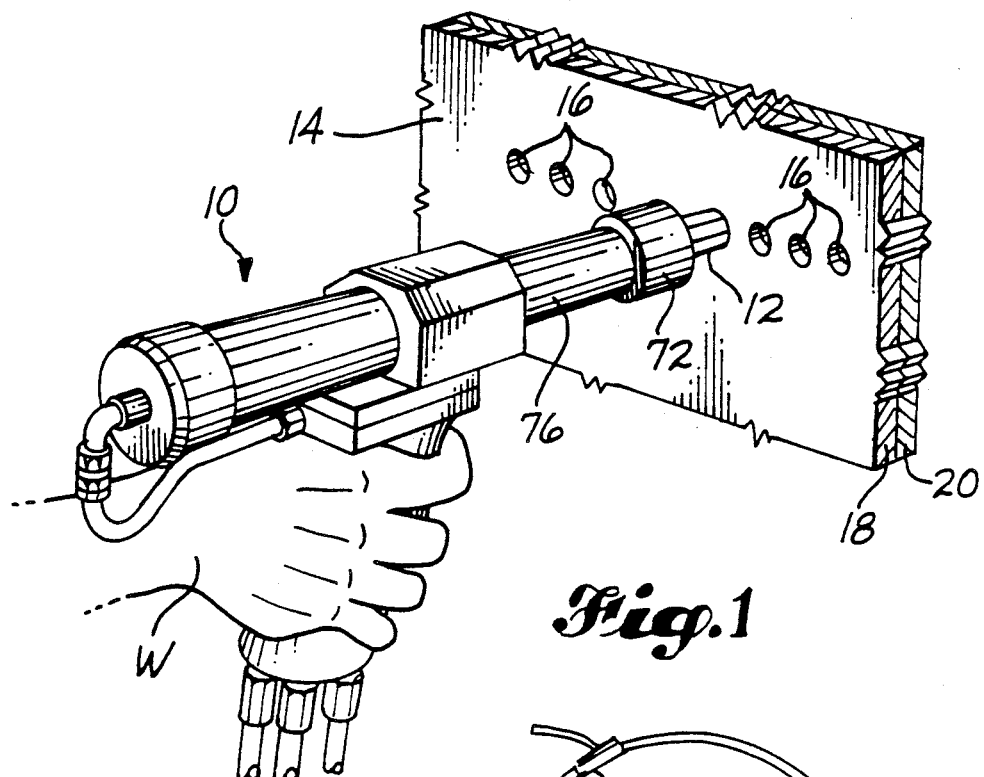
FIG. 1 is a pictorial view of a puller tool, taken from above and towards one side of the tool, showing the tool in the process of pulling a mandrel through a split sleeve located in an opening in a workpiece, for expanding the opening.

FIG. 1 shows apparatus of the invention being used to cold expand fastener openings in a workpiece. The apparatus includes a puller tool 10, shown held in the hand of a workman. Puller tool 10 includes a nose portion 12 which is in contact with a region of the workpiece 14 immediately surrounding one of a plurality of fastener openings 16. In the illustrated example, the workpiece 14 comprises a pair of metal members 18, 20 which are to be connected together and/or to a frame member, by fasteners, e.g. bolts or rivets, which will extend through the openings 16. The workpiece openings 16 are aligned openings of the same diameter, one of which extends through member 18 and the second of which extends through member 20. Herein the aligned openings will be described as if each is a single opening because the cold expansion process is performed on the aligned openings as if they were a single opening.

Figure 2:
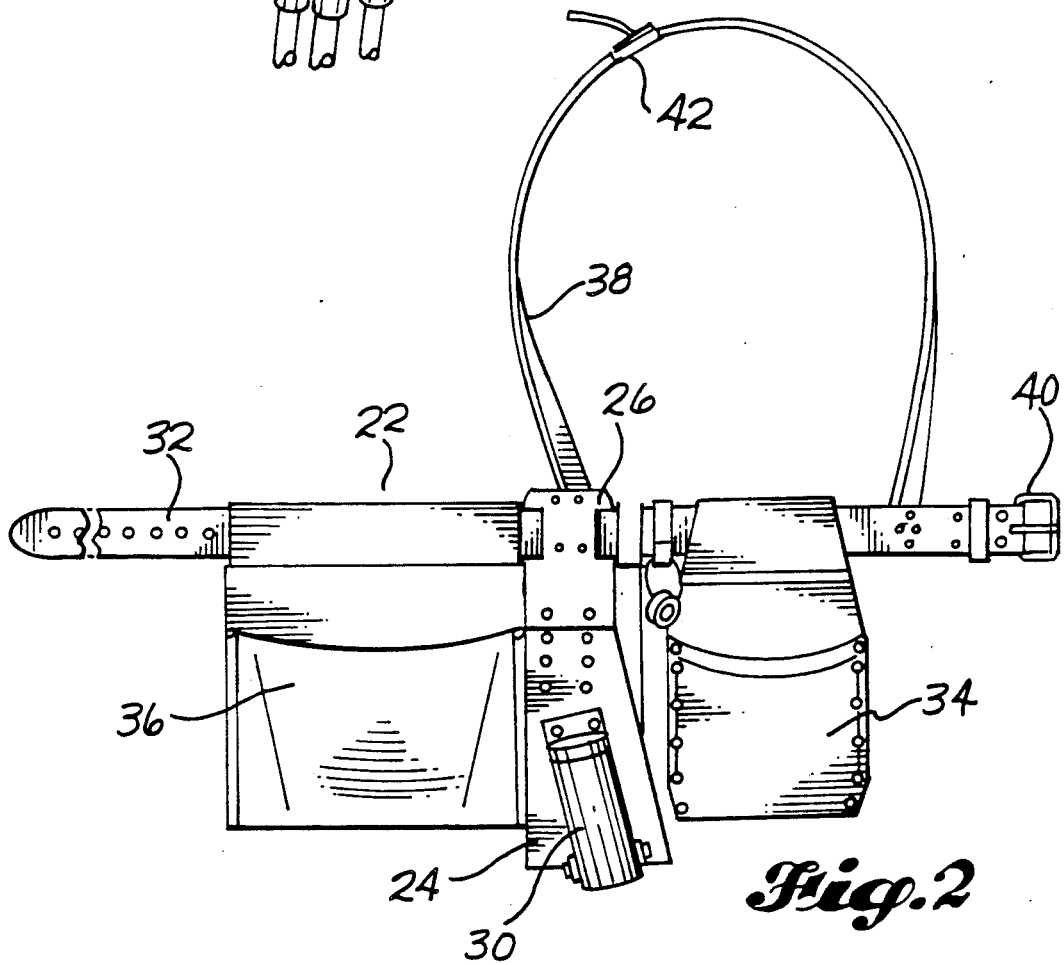
FIG. 2 is an elevational view of a support apron for a sleeve loader and a pair of sleeve pockets, shown in a flat condition.

FIG. 2 illustrates a first type of support 22 for a preferred embodiment of sleeve loader 24 The support 22 includes a panel 26 onto which the sleeve loader 24 is mounted, in a manner to be hereinafter described. The sleeve loader includes a housing 28 (FIG. 4) which is located within a pocket 30 that is secured to panel 26. In preferred form, panel 26 is secured to a waist belt 32. Preferably, a new sleeve pouch or pocket 34 is connected to the waist belt 32, on one side of the panel 26. A second, used sleeve pouch or pocket 36 is secured to the waist belt 32 on the opposite side of panel 26. The support 22 may also include a shoulder belt or harness 38. In the illustrated embodiment, one end of a shoulder belt 38 is connected to the upper end portion of panel 26. The opposite end is connected to the waist belt 32 closely adjacent a belt buckle 40. Shoulder belt 38 may be separated generally at its middle, with one part including a buckle 42 for connecting the two parts together. The belts 32, 34, the panel 26, tubular pocket 30 and pouches 34, 36 may be constructed from leather.

Figure 3:
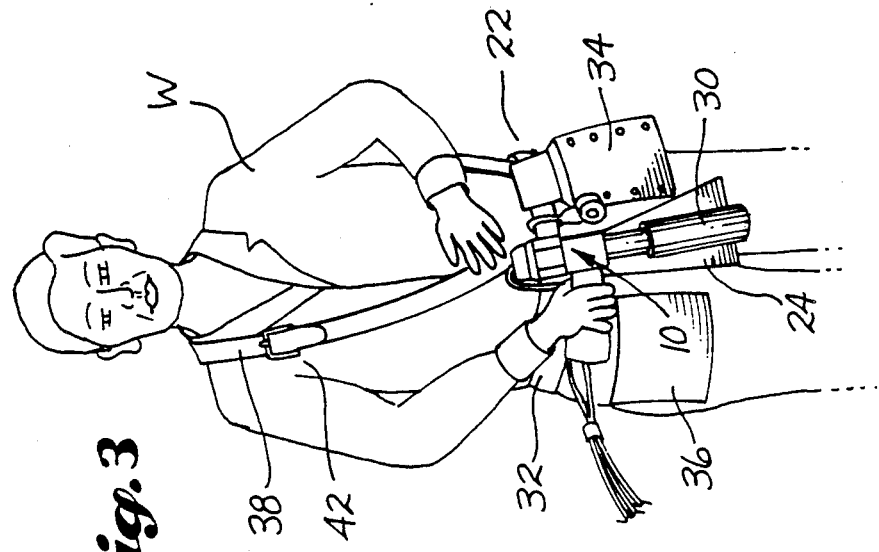
FIG. 3 is a pictorial view of the apron on a workman, showing the workman holding a puller tool into the sleeve loader, to receive a sleeve.

In FIG. 2 the various components of the support 22 are shown as they would appear if the support 22 were laid down onto a flat surface FIG. 3 shows the support 22 being worn by a workman W. As shown in FIG. 3, the waist belt 32 extends about the waist of the workman W. The shoulder belt 38 extends upwardly from waist belt 32, along the back of the workman W, then, over a shoulder of the workman W, and then down to a connection to the top of panel 26. The sleeve loader 24 is positioned in front of the workman W, below his waist, in a position making it convenient for the workman W to hand insert the mandrel end of the puller tool 10 into the sleeve loader 24, to receive a sleeve, and then withdraw the tool 10 out from the sleeve loader 24, with a sleeve S on the mandrel M.

Referring to FIG. 1, the mandrel M is shown to include an inner end 44 which may be threaded for connection to a piston within the puller tool 10. Starting at the inner end 44, and moving axially outwardly, the mandrel M includes, in series, the inner end 44, a flange 46 which includes wrench surfaces 48, a small diameter portion 50, an increasing diameter portion 52, and a large or maximum diameter portion 54. Outwardly of large diameter portion 54 mandrel M may include a tapered or rounded lead in portion 56.

The puller tool 10 includes a tubular sleeve holder 58 having a flange 60 adjacent its inner end. The tubular body of holder 58 includes a central passageway 62' in which the mandrel M is received. The tubular body is axially split at 62, for about one third to two thirds of its length. The splits 62 are spaced circumferentially about the tubular body. They divide the outer end portion of the tubular body into a plurality of fingers 64 Collectively, the outer ends of the fingers 64 define a sleeve end contacting end surface 66.

The sleeve holder 58 is received within a nosepiece 68, which is herein also sometimes referred to as a nose portion. Nosepiece 68 includes a mounting flange or base 70 at its inner end. A retainer ring 72 that is internally threaded is screw connected to threads 74 (FIG. 14). On an end portion of the main body 76 of the puller tool 10. Nosepiece 68 includes an elongated tubular portion extending axially outwardly from base 70. This tubular portion is divided into a plurality of fingers 78 (e.g. six) by a plurality of axially extending splits 80. A stiffening ring 82 may be provided on the tubular portion adjacent base 70, as illustrated in FIG. 11. As will hereinafter be described in more detail, the fingers 78 are each in the nature of a leaf spring. The ring 78 shortens the fingers 78, causing them to be stiffer, i.e. to be stronger springs. Ring 82 effectively shortens the fingers 78 by connecting them together in the region surrounded by the ring 82. The finger stiffness can be changed by changing the ring thickness and/or the finger thickness. It is possible to stiffen the fingers 78 by shortening the splits 80, so as to make the ring 82 unnecessary.

Figure 4:
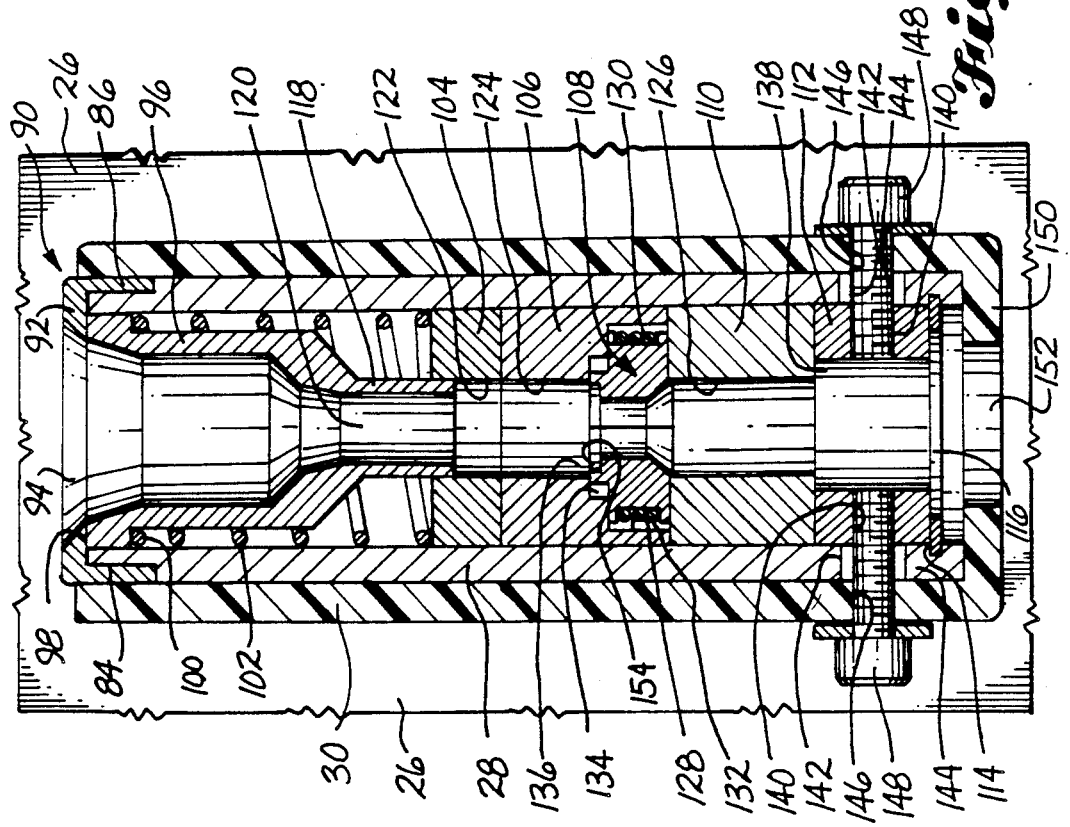
FIG. 4 is a longitudinal sectional view of a sleeve loader, in a first configuration.

Referring to FIG. 4, in the preferred embodiment, the sleeve loader housing 28 is in the form of an elongated tubular casing and will at times be referred to as the "casing". The housing or casing 28 is located in a tubular pocket 30 which is a part of the support 22. The upper end portion of casing 22 includes an annular outside recess 84. A cylindrical sidewall 86 of a retainer ring 90 fits in the recess 84. When cylindrical wall 86 is within recess 84 its outer surface is a substantial continuation of the outer surface of casing 28. Retainer ring 90 includes an annular end wall 92, including a central opening 94 which is an end opening leading into and out from the sleeve loader housing 28. An entry member 96 is positioned within the entry portion of the housing 28. In the preferred embodiment, the housing 28 has a generally vertical orientation and entry member 96 is within the upper end portion of the housing 28 Entry member 96 includes an outer end surface 98, shown in FIG. 4 to be in contact with the inner surface of flange 92. The outer end portion 98 of entry member 96 has an outside diameter which is snugly received within the inside diameter of tubular housing 28 A shoulder 100 is formed between this outer end portion and a reduced diameter central portion of the entry member 96. As is explained below, shoulder 100 forms a first end abutment for a compression spring 102 which functions to bias the entry member 96 outwardly, into the position shown in FIG. 4. The entry member 96 and spring 102 are moved into casing 28 through the lower end of casing 28. Also positioned within casing 28 are a first spacer ring 104, a second spacer ring 106, a sleeve support 108, a third spacer ring 110, and a retainer ring 112. An annular groove 114 is formed in the inner surface of casing 28 adjacent the lower end of casing 28. This groove 114 receives a lock ring 116.

The entry member includes a tubular, small diameter inner end portion 118. Portion 118 includes a central opening 120 having a diameter that is larger than the maximum diameter portion 54 of mandrel M. The tubular portion 118 is telescopically received within a central opening 122 in spacer ring 104. Spacer ring 106 includes a central opening 124. Spacer ring 110 includes a central opening 126. Openings 122, 124, 126 are all equal in diameter. Spacer ring 106 includes a socket 128 at one of its ends, which in FIG. 4 is its lower end. Socket 128 receives the sleeve support 108. As shown by FIGS. 4-6, 9 and 10, the sleeve support 108 is in the nature of a ring that has been divided into a plurality of segments SS. In the preferred embodiment, there are six segments SS. The segments have axially extending abutting surfaces. Sleeve loader 108 includes a peripheral groove 130 into which at least one elastic band 132 is received. The preferred embodiment includes three elastic bands 132 which are in the nature of elastic O-rings. The elastic bands 132 exert an inward squeezing force on the segments SS, holding them together, in an abutting relationship, each to its two neighbors.

Socket 128 may be of stepped construction and sleeve support 108 may also be of stepped construction. Referring to FIG. 4, socket 128 is shown to include an inner end portion 134 which is smaller in diameter than the main portion of the socket 128. Sleeve support 108 includes a projecting end portion 136 which fits into socket portion 134 When sleeve support 108 is in a contracted condition, as shown by FIG. 4, an annular space exists in the main part of socket 128, for the main part of sleeve support 108, and a similar annular space exists in socket part 134 for sleeve support part 136. These spaces provide room for a radial expansion of the sleeve support 108. The main portion of sleeve support 108 has an axial length which is slightly less than the depth of the main portion of socket 128. The axial length of sleeve support portion 136 is slightly less than the depth of socket portion 134. As a result, the sleeve support 108 is not restrained at its ends by contact with the ends of the spacer rings 106 and 110. Sleeve support 108 is captured between spacer rings 106 and 110, but the above-described dimensional relationships prevent sleeve support 108 from being clamped against movement by its contact with the end surfaces of the spacer rings 106, 110.

The retainer ring 112 includes a central opening 138 which is preferably larger in diameter than the openings 122, 124, 126.

The assembly of the sleeve loader parts is as follows. With lock ring 116 removed, and with the casing 28 being positioned out from pocket 30, the entry member 96 is first inserted into the casing 28, through the lower end of the casing 28. Member 96 is moved into the casing 28 until its outer end makes contact with retainer flange 92. Then, compression spring 102 is installed. Next, spacer ring 104, then spacer ring 106, then sleeve support 108, and then spacer ring 26, and then retainer ring 112 are installed, in that order (for the configuration shown by FIG. 4). The inserted elements are pushed endwise against the spring 102 until the outer end surface of retainer ring 112 is positioned inwardly of groove 114. The upper surface of spacer ring 104 functions as a second abutment for the spring 102. When all the parts are within casing 28, lock ring 116 is installed. When retainer ring 112 is installed it is necessary to align the radial openings 140 in it with the radial openings 142 which are provided in the sidewall of casing 28.

Lock ring 116 holds all of the inserts within casing 28 prior to insertion of casing 28 into the pocket 30. Pocket 30 includes sidewall openings 146 which are alignable with openings 140 and 142. As will be evident, the casing 28 is inserted into pocket 30, through the open upper end of pocket 30. It is then moved downwardly until it is within the pocket 30. It is also rotated to the extent necessary to place the openings 140, 142 in alignment with the openings 146. Then, retainer bolts 148 are installed. Retainer bolts 148 are moved first through openings 146, then through openings 142, and are screwed into the openings 140. The openings 140 are internally threaded with threads which will mate with the threads on the bolts 148. As shown by FIG. 4, pocket 30 may include a lower end wall 150. End wall 150 may include a central opening through which the mandrel may pass.

The end opening 94, the central openings in the entry member 26, the spacer rings 104, 106, 110, the sleeve support 108, the retainer ring 112, and the end wall 150, all constitute parts of a mandrel receiving passageway which extends axially through the sleeve holder.

Figure 13:
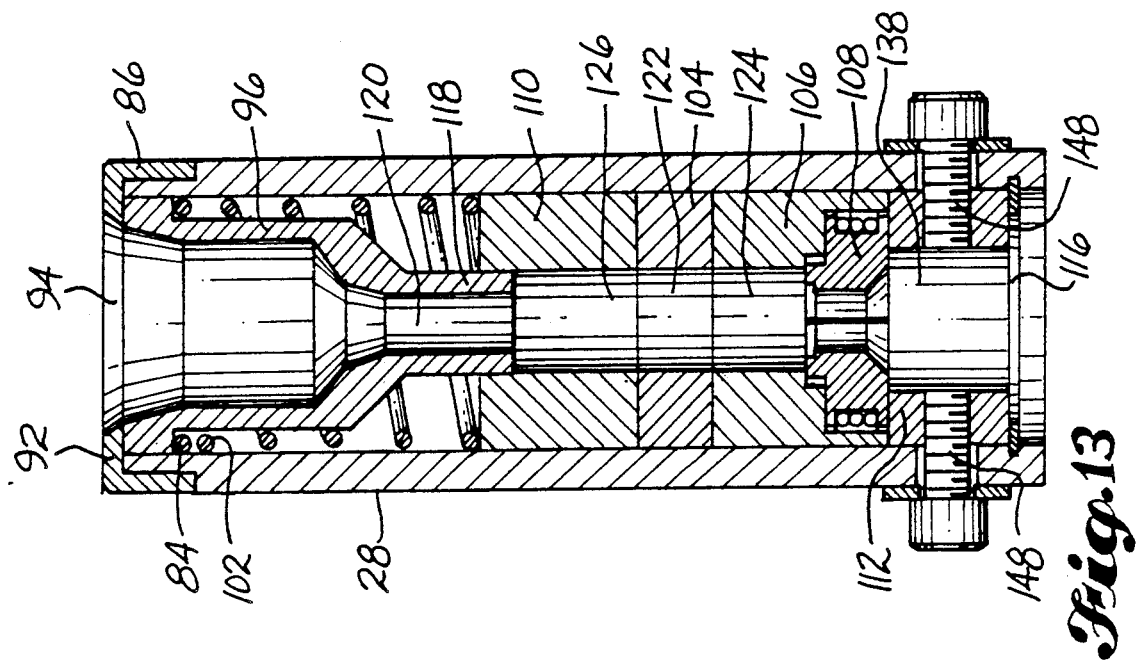
FIG. 13 is a view like FIG. 12, shows a third configuration of the sleeve support and spacer rings within the sleeve loader.
Figure 12:
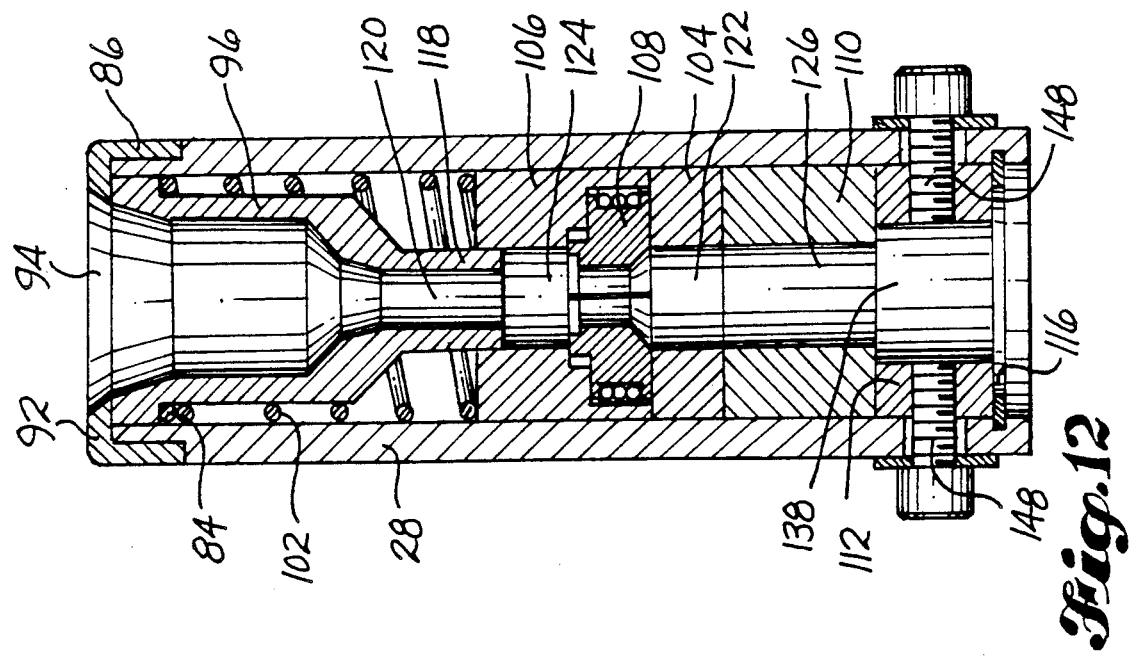
FIG. 12 is a view like FIG. 4, but showing the sleeve loader outside of its pocket and showing a second configuration of the sleeve support and the spacer rings within the sleeve holders.

FIGS. 12 and 13 are like FIG. 4 but show the sleeve loader outside of the pocket 30 and the order of the inserts is changed. Comparing FIGS. 4 and 12, in FIG. 12 the spacer ring 104 is shown to be repositioned below the sleeve support 108. It is positioned between sleeve support 108 and spacer ring 110. This repositioning moves spacer ring 106 and tool support 108 upwardly, placing tool support 108 closer to the end opening 92. Comparing FIGS. 4 and 13, in FIG. 13 the spacer ring 110 is moved from below sleeve support 108 into a position above spacer ring 104. This relocates the sleeve support 108 into a position near the bottom of the casing 28. It spaces the sleeve support 108 a further distance away from the end opening 92. Accordingly, the use of several spacer rings, and spacer rings which differ in length, provides an easy way of adjusting the sleeve loader for different length sleeves. The uppermost ring will serve as the lower end abutment for spring 102. As will be apparent, additional inserts having different size central openings, may be used for adjusting the sleeve loader to different diameter mandrels M.

The split sleeve S is a one-piece member. It may be constructed by rolling a flat piece of sheet metal around a form so as to give it a tubular shape, with a lengthwise split A method and apparatus for manufacturing sleeves S are disclosed in Clair M. Harter U.S. Pat. No 3,665,744, granted May 30, 1972. One of the advantages of using a split sleeve S in conjunction with a mandrel, for cold expanding an opening, is that the inside surface of the sleeve can be coated with a layer of dry lubricant. Lubricants which have been used are described on page 7 of a paper entitled "Fatigue Improvement By Sleeve Coldworking", written by Joseph L. Phillips, and published by The Society of Automotive Engineers, Inc., on or about Oct. 16, 1973. The layer of dry lubricant on the inside of the sleeve S provides a lubricant between the inside of the sleeve and the contacting surfaces of the mandrel M. The lubricant allows the mandrel M to slide relatively through the sleeve S, while radially expanding the sleeve S against the workpiece material.

Figure 5:
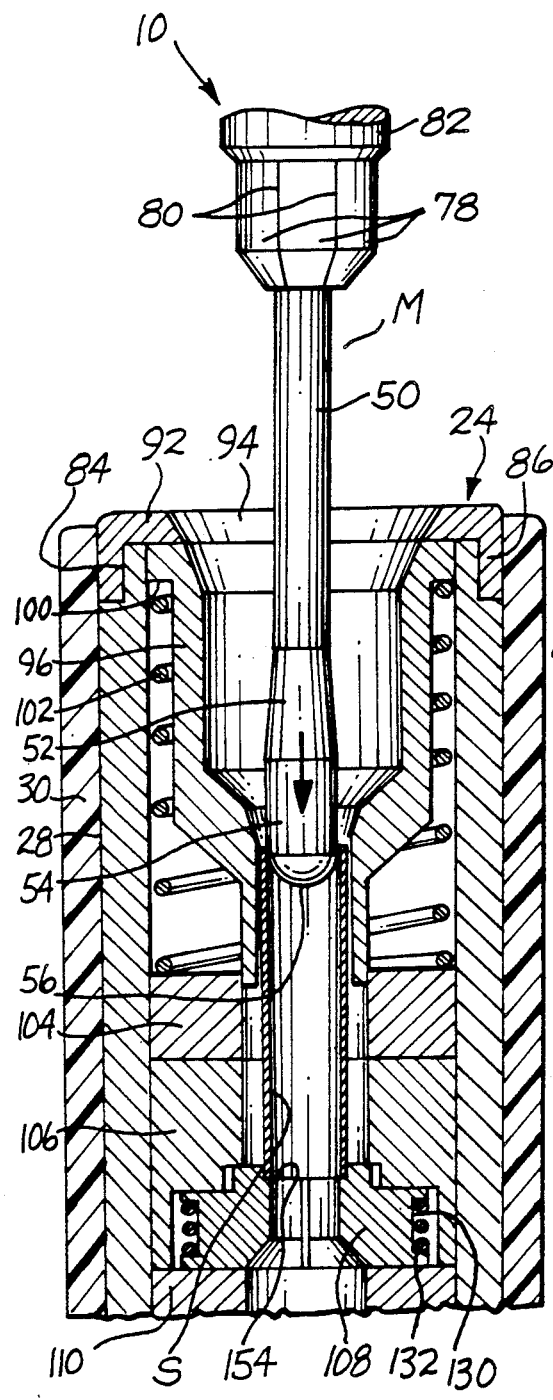
FIG. 5 is a view like FIG. 4, but showing a sleeve within the sleeve loader, supported by a sleeve support, and showing the entry of a mandrel into the sleeve loader and sleeve.
Figure 6:
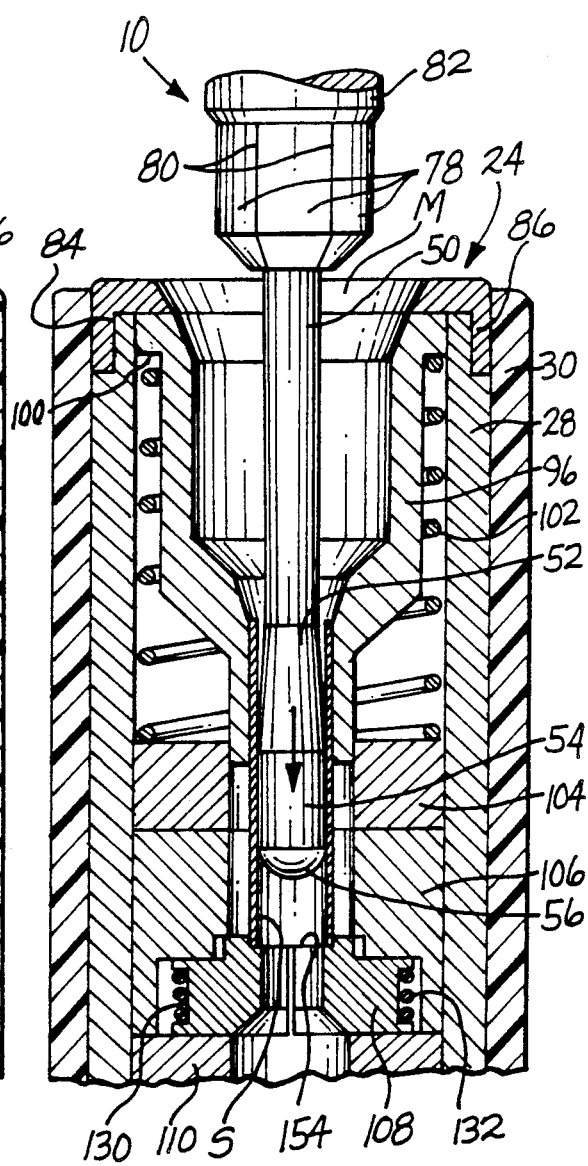
FIG. 6 is a view like FIG. 5, but showing the mandrel moved further into the sleeve.

Referring to FIG. 5, a sleeve S is dropped into the sleeve loader 24, through the end opening 94. The lower end of the sleeve S moves onto a radial or end surface 154, on the sleeve support 108. Surface 154 is directed upwardly toward the end opening 94. Surface 154 may be the base surface of a shallow recess formed in the upper end of sleeve support 108. Since sleeve support 108 is segmented, each segment SS includes a part of the support surface 154. The several parts together define an annular surface which is within a radial plane and is directed axially outwardly towards the end opening 94. Entry portion 96 is in the nature of a funnel, having a series of converging surfaces which will direct a sleeve S towards the opening 120. The opening 120 and entry portion 96 will guide the sleeve S downwardly, to place its lower end on the surface 154. The workman W need only drop a sleeve S through the end opening 94, and the entry member 96 will guide it downwardly into a supported position on the surface 154. As shown by FIG. 5, the puller tool 10 is positioned to align the leading end portion 56 of mandrel M with the end opening 94 This is done when the mandrel M is extended. The tool 10 and mandrel M are then moved downwardly, to place lead end portion 56 of mandrel M into the upper end portion of the sleeve S. Further downward movement of the tool 10 and mandrel M causes a radial expansion of the sleeve S. The opening 120 is sized to permit this expansion. The convergent shape of the mandrel lead end portion 56 causes a gradual expansion of the sleeve S. Maximum expansion is achieved when the maximum diameter portion 54 of mandrel M is within the sleeve S. As the mandrel M moves downwardly relatively through the sleeve S, radially outwardly directed forces are also directed on the segments SS of the sleeve support 108. The resilient bands 132 will stretch as the segments SS move radially outwardly and apart from each other. Movement of the maximum diameter portion 54 of mandrel M through the sleeve support 108 will cause a maximum expansion of the sleeve support 108. During such expansion supporting contact will be maintained between the inner end of the sleeve S and the support surface 154, because the sleeve S will itself expand as the segments SS are forced radially outwardly. Stated another way, the outward movement of the segments SS increases the diameter of the support surface 154. At the same time the diameter of the sleeve S is increased an amount sufficient to maintain contact between the end of the sleeve S and the surface 154.

Figure 8:
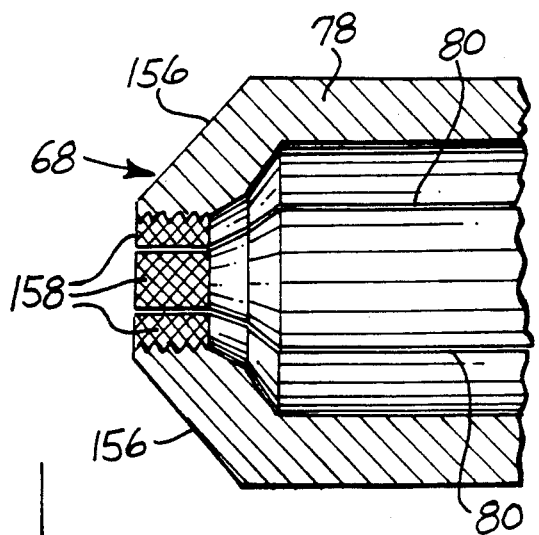
FIG. 8 is an enlarged scale fragmentary, axial sectional view taken through the outer end portion of a nosepiece on the puller tool.
Figure 7:
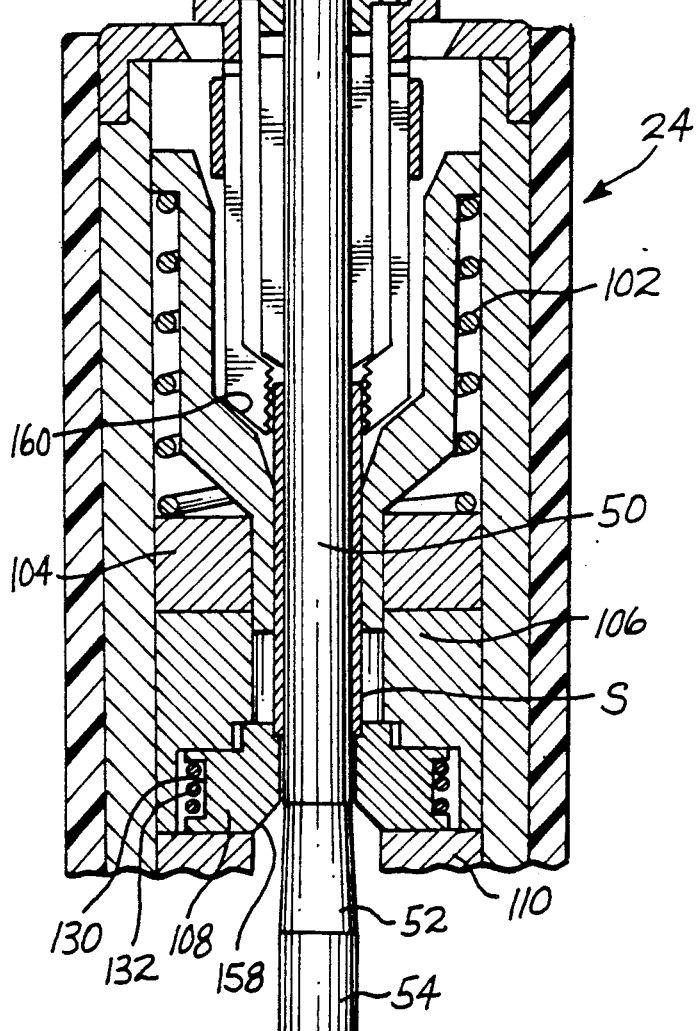
FIG. 7 is a view like FIGS. 5 and 6, but showing the mandrel fully inserted into the sleeve loader.
Figure 9:
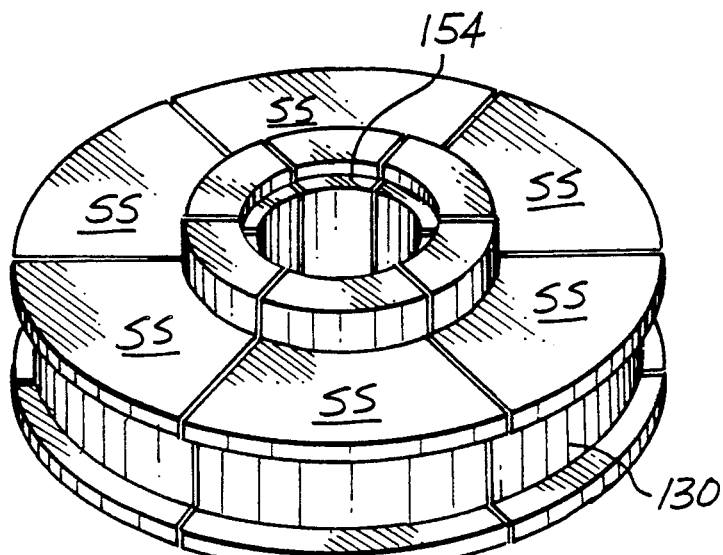
FIG. 9 is a pictorial view of the sleeve support, looking down towards its lower end.
Figure 10:
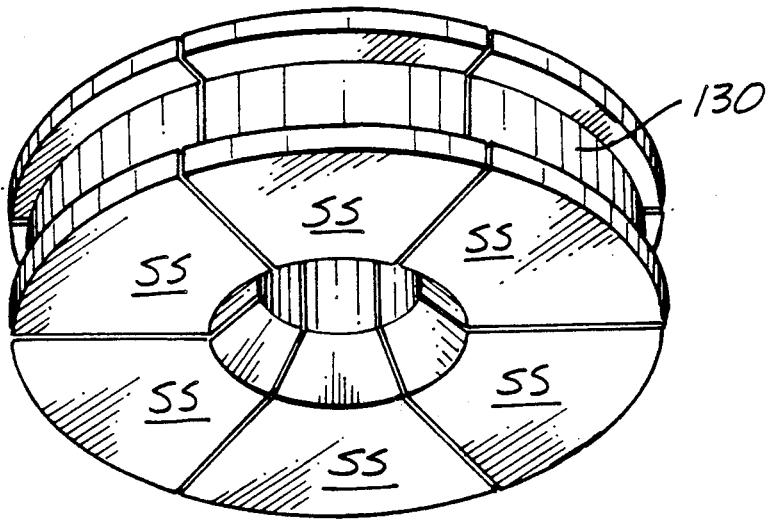
FIG. 10 is another pictorial view of the sleeve support, looking upwardly towards its lower end.

As shown by FIG. 7, the tool 10 is moved downwardly a sufficient distance to place the upper end of the sleeve S into the sleeve end receiving space defined within the outer end portion of the nosepiece 68, endwise outwardly from the sleeve end contacting surface 66 of the sleeve holder (FIG. 11). As best shown by FIG. 8, the outer end portions 156 of the fingers 78 include radially inwardly directed grip surfaces 158. Grip surfaces 158 may be knurled surfaces, segments of circular threads, segments of a helical thread, etc. The important thing is that the grip surfaces be capable of gripping onto a sleeve S, at a time in the operation of the equipment when it is desired that the sleeve S be held by the nosepiece 68.

When the upper end portion of the sleeve S is within the sleeve space, and the upper end of the sleeve S is against the sleeve end contacting surface 64, the increasing diameter portion 52, the maximum diameter portion 54 and the leading portion 56 of mandrel M are all positioned below the expandable sleeve support 108 (FIG. 7). The small diameter portion 50 of mandrel M is within the center opening of sleeve support 108 and the sleeve S is on the small diameter portion 50. As a result, the sleeve S is in a relatively contracted state. In this state it has an outside diameter which is substantially equal to the diameter of maximum diameter portion 54, or at least is of a size to fit through an opening 16 in the workpiece 14.

As the tool 10 is moved downwardly, to position the sleeve S on mandrel portion 50 and the sleeve end against sleeve end contacting surface 66, there is contact between the end surfaces of the nosepiece 68 and a converging surface 160 within entry member 96. Contact will occur before the sleeve end is against the surface 66. Additional downward movement of the tool 10, following contact, will force the entry member 96 downwardly, against the force of spring 102. After the sleeve S is properly positioned on the mandrel portion 50, and within the sleeve space in nosepiece 68, the tool 10 can be moved upwardly to retract the mandrel M and the sleeve S out from the sleeve loader 24. The lower end of sleeve support 108 includes an upwardly converging guide surface 158. As mandrel M moves upwardly, its increasing diameter portion 52 makes contact with at least the upper end of surface 158. In any event, the sleeve support 108, in response to its contact with first mandrel portion 52 and then mandrel portion 54, will expand as necessary, to allow removal of the mandrel M out from the sleeve loader 24. Upward movement of nosepiece 68 will allow spring 102 to move the entry member 96 upwardly until its movement is arrested by contact with the flange 92. The sleeve S retains its position on the mandrel portion 50 while the mandrel M is withdrawn from the sleeve loader 24.

In preferred form, the puller tool is hand held and is in the form of a "gun". It includes a handle 162 on which the main body 76 is mounted. Referring to FIGS. 14 and 15, the main body 76 is tubular and includes a forward portion 164 and a rearward portion 166. The forward end of the rearward portion 166 is internally threaded at 168. The forward portion 164 is externally threaded at 170, for connection with the threads 168. Forward section 164 includes a radial flange 172. An O-ring seal 174 is placed on the threaded end portion 170, against the flange 172. Then the two sections 164, 166 are screwed together. The seal 174 becomes compressed between the front end of rear section 166 and the rearwardly directed side of flange 172, as shown in FIGS. 14 and 15. A two part fixed wall is provided within section 166. The forward part is designated 176 and the rearward part is designated 178. These parts 176, 178 include central openings 180, 182, respectively, through which a piston rod 184 extends. A first piston head 186 is connected to the rear end of rod 184. A second piston head 188 is connected to the forward end of rod 184, forwardly of the fixed walls 176, 178. The rear end of housing portion 166 is externally threaded at 190. An end cap 192, having a cylindrical sidewall 194, and internal threads 196, is screwed onto the thread 190.

A first variable volume chamber 198 is defined axially between piston head 186 and the radial end wall 200 of cap 192. A second variable volume chamber 202 is defined axially between piston head 186 and fixed wall 178. A third variable volume chamber 204 is defined axially between fixed wall 176 and piston head 188. A fourth variable volume chamber 206 is formed forwardly of piston head 188. Chambers 198, 202 and 204 are working chambers. Chamber 206 is vented. The inner end 44 of mandrel M is connected to piston head 188, by screw connection. Suitable seals are provided between the piston heads 186, 188 and the chamber walls. Seals are provided between fixed wall 178 and piston rod 184 and between fixed wall 178 and the internal surface of housing section 166.

The fluid delivery system for the puller tool 10 may include a block 208, sandwiched between the upper end of handle 162 and the lower end of a mounting boss 210 that is a part of housing section 166. Block 208 may include four fastener receiving openings 210, one adjacent each of its corners. The upper end of the handle includes a flange 214 having four fastener openings (not shown) of the same spacing. The openings 216 in flange 214 are aligned with the openings 212. The mounting boss 210 on housing section 166 includes four internally threaded sockets When the parts are assembled, the openings in handle 214 are aligned with the openings 212 in block 208 and the threaded sockets in mounting block 210. Fastener bolts are inserted upwardly through the aligned openings and are screwed into the threaded sockets.

Working chambers 198 and 204 receive compressed air via passageways 219, 220, 222 and 224. Passageways 220 and 222 receive compressed air from a passageway 226 which extends through the handle. Chamber 202 receives hydraulic fluid which both enters and leaves chamber 202 via a port 228. Port 228 is a part of a passageway 230 which extends through the handle 162, through the block 208 and through the mounting boss 210.

Handle 162 includes an exhaust port 232 which is in communication with an exhaust passageway 234, via a ball valve 236 which is normally biased into a closed position by a spring 238. A rod 239 projecting inwardly from trigger 240 contacts ball 236. When the trigger 240 is depressed, the ball 236 is moved inwardly against the spring 238, compressing the spring 238 and opening the valve orifice (FIG. 16). This communicates passageway 226 with vent opening 232 Trigger 240 is shown in a depressed position in FIG. 15.

When the trigger valve is closed, compressed air from an air supply 242 (FIG. 22) is continuously delivered through a supply conduit 244 to the air passageway 226 within handle 162. The air moves from passageway 226 through passageways 220, 222, and 224, into the working chambers 204 and 198. As previously stated, chamber 206 is vented to atmosphere. Working chamber 202 is normally connected to tank or return. Accordingly, the compressed air within chambers 198 and 204 acts on the piston heads 186 and 188, respectively, to move the piston assembly 184, 186, 188, and the mandrel M, forwardly. When the piston assembly 184, 186, 188 is as far forward as it will go, the mandrel M is fully extended.

Figure 22:
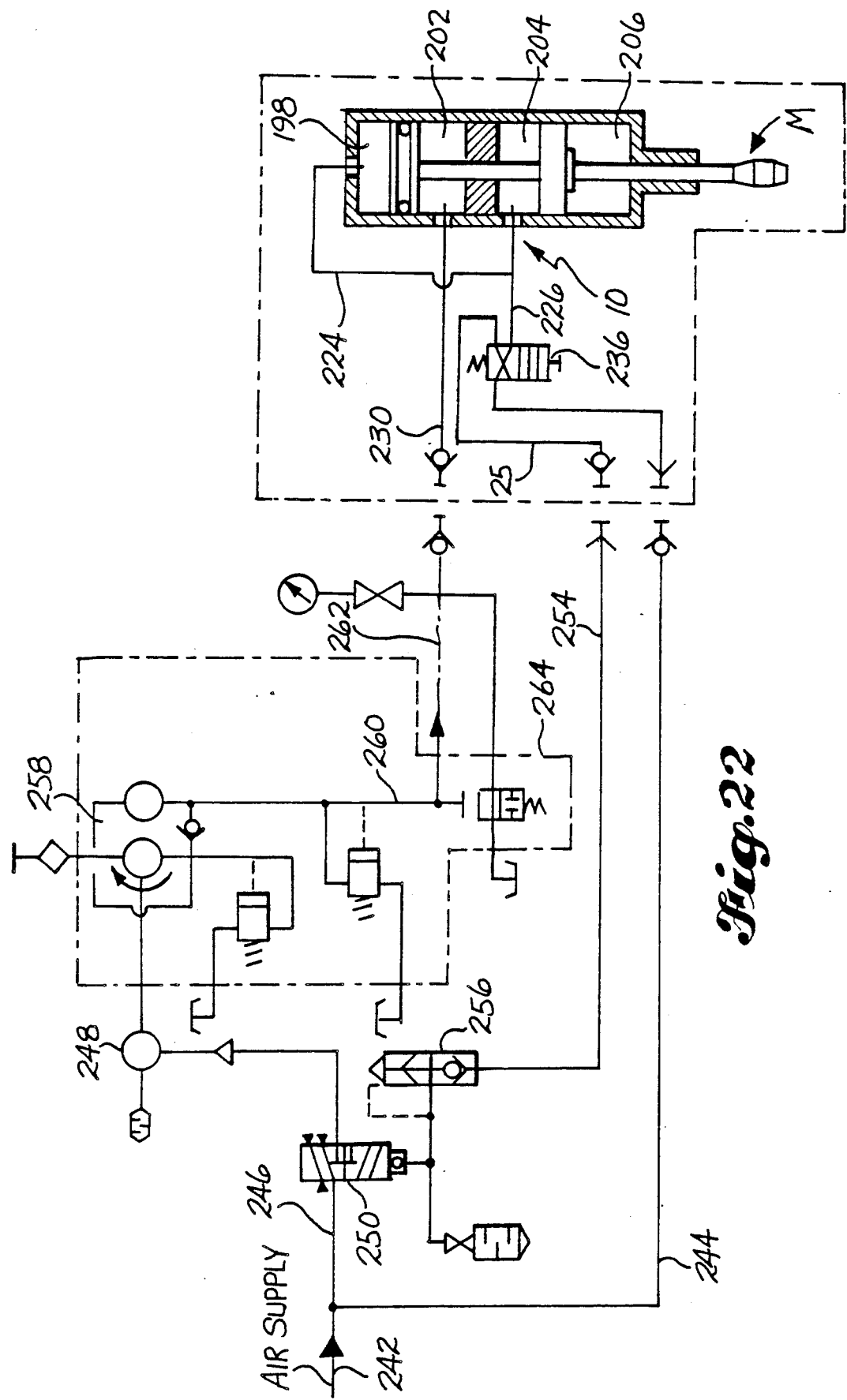
FIG. 22 is a schematic diagram of the control system for the puller gun.

Referring now to FIG. 22, the air supply 242 is also connected to a normally closed conduit 246 which extends to an air motor 248. Conduit 246 is opened and closed by a normally closed valve 250. The ball valve 236, which may also be termed the trigger valve, is biased into a vent closing position by the spring 238. When the trigger valve 236 is depressed against spring 238, the compressed air in working chambers 198, 204 is vented to atmosphere via port 232, the valve orifice and vent passageway 234. At the same time, compressed air in conduit 244 is communicated by passageway 234 in the handle 162 to a conduit 254 which leads to a quick exhaust valve 256. This delivery of compressed air to quick exhaust valve 256 triggers valve 250, moving it into an open position, in which it communicates air supply conduit 256 with the air motor 248. The compressed air traveling through air motor 248 drives a pump 258 which pumps hydraulic fluid through conduits 260 and 262. Conduit 262 is connected to conduit 230 within handle 162. The hydraulic fluid flows through passageway 230 (FIG. 17) into working chamber 202. The hydraulic fluid in chamber 202 acts on piston head 186, moving the piston assembly 184, 186, 188 rearwardly. In this manner the mandrel M is retracted. The use of the air/hydraulic system permits fast extension of the mandrel M and a forceful retraction of the mandrel M. The use of two air chambers 198, 204 provides both a quicker extension and a more forceful extension of the mandrel M.

Following a retraction of the mandrel M, the workman W removes his finger from the trigger valve 236. Spring 238 returns the valve 236 to a closed position. Pressure immediately builds up with the chambers 198, 204. Quick exhaust valve 256 is triggered and it causes movement of valve 250 back to a closed position, terminating the supply of compressed air to the air motor 248. Hydraulic drain valve 264 is open, permitting flow of oil out from chamber 202, back to tank.

The method of the invention will now be described. Firstly, a sleeve S is dropped into the sleeve loader 24, into a position with its lower end on the support surface 154 of the sleeve support 108. Next, the puller tool 10, with mandrel M extended, is moved to place the mandrel M in alignment with the end opening 94 in sleeve loader 24. With the mandrel M so aligned, the tool 10 is moved vertically downwardly, to move the mandrel into the sleeve loader 24, to and through the sleeve S. As described above, the movement is continued until the sleeve S is on the small diameter portion 50 of mandrel M and the upper end portion of the sleeve S is within the sleeve space in the end portion of the nosepiece 12, and the upper end of the sleeve S is against the sleeve end contacting surface 66 of the sleeve holder 58. Then, the tool 10 is moved upwardly, to retract the mandrel M and sleeve S out from the sleeve loader 24. The tool 10 is then moved towards the workpiece 14 to align mandrel M with an opening 16 in the workpiece 14. The tool 10 is then moved endwise to insert the mandrel M into the opening 16. As previously described, the maximum diameter end portion 15 of mandrel M has an outside diameter slightly smaller than the diameter of the opening 16. Also, the sleeve S, while it is on the small diameter portion 50 of the mandrel M, has an outside diameter which will allow it to be moved into the opening 16. The tool 10 is moved endwise until the sleeve S is within the opening 16 and the workpiece contacting end surface of the nosepiece 12 is in contact with the workpiece 14.

In the illustrated embodiment, the opening 16 includes a countersink at its entrance. The end region of the nosepiece 12 is tapered to fit into the countersink. When the workpiece contacting end surface of the nosepiece 12 is in engagement with the workpiece 14, the increasing diameter portion 52 and the maximum diameter portion 54 of the mandrel M are positioned on the opposite side of the workpiece 14 from the puller tool 10. When contact is made between the nosepiece 12 and the workpiece 14, the puller tool 10 is operated to retract the mandrel M. First the increasing diameter portion 52 and then the maximum diameter portion 54 are pulled through the sleeve S. Movement of the mandrel portions 52, 54 through the sleeve S is facilitated by the dry lubricant which is on the inner surface of the sleeve S. As they move through the sleeve S, the mandrel portions 52, 54 exert a radially outwardly directed force on the sleeve S. The sleeve S is expanded and as it expands it exerts a radially outwardly directed force on the material immediately surrounding the opening 16. The expanded sleeve S compressively prestresses a significant zone in the material around the opening. Retraction of the mandrel M is continued until the maximum diameter portion 54 is substantially in the position shown by FIG. 19.

The spring energy in the nosepiece fingers 78, force the grip surfaces 156 of the nosepiece 12 into tight gripping engagement with the sleeve S when expansion of the opening 16 is complete the tool 10 is moved away from the workpiece 14. Owing to the grip by the grip surfaces 158 on the sleeve S, the sleeve S is pulled out from the opening 16 as the tool 10 is pulled away from the workpiece 14. This is shown by FIG. 20. When the mandrel M is in the position shown by FIG. 20, end portion 56 of mandrel M contacts the inner end of sleeve S. Operation of tool 10 to extend mandrel M will push surface 56 endwise outwardly against the sleeve S. In response to mandrel movement the sleeve S is moved endwise outwardly from nosepiece 12, i.e. it is expelled from nosepiece 12.

The embodiment of the invention which includes an operator worn carrier 22 for the sleeve loader, and a hand held puller tool or "gun" 10, operated in the manner described, provides a semi-automatic system of cold expanding the holes 16. In accordance with an aspect of the invention, the operation can be made more automatic by using a robot R to control the puller tool. Referring to FIG. 23, a robot arm 274 is shown to be connected to a puller tool 10, which may be essentially like tool 10, except that it is moved by a robot R and commanded by a computer. Robot technology is well developed and for this reason the details of the robot R and its control system are not disclosed herein. The robot R is operated by a computer command to make the necessary movements of the tool 10', in the proper sequence.

In FIG. 23 a stationary sleeve loader 24' is illustrated. A split sleeve S is shown being delivered by a feed conveyor 276 into the end opening 94 of the mandrel receiving passageway. Sleeve loader 24' may be like sleeve loader 24, described above.

In operation, a sleeve S is delivered into the sleeve loader 24', onto the support surface 74. Then, the robot R is operated to move the puller tool 10' into a position placing mandrel M in alignment with end opening 94. Then, robot R is operated to move the tool 10' downwardly, to move the mandrel M into the sleeve loader 94', to and through the sleeve S. Following loading of the sleeve S onto the mandrel M, in this manner, the robot R is operated to retract the puller tool 10', to move the sleeve carrying mandrel M out from the sleeve loader 24'. Next, robot R is operated to swing the puller tool 10' over to the workpiece 14, to place the mandrel M into axial alignment with an opening 16. Following alignment, the robot R is operated to move the tool 10' endwise to place the sleeve S within the opening 16 and the workpiece contacting surface of the nosepiece 12 against the nosepiece. When this is done, the robot R is operated to retract the mandrel, to pull it through the sleeve S and expand the opening 16, in the manner that has been described. Following a full retraction of the mandrel M, the robot R is operated to move the tool 10' away from the workpiece 14. In the manner described above, the sleeve S is gripped by the nosepiece 12, and is pulled out from the opening 16, as the tool 10' is moved away from the workpiece 14. Once the sleeve S and mandrel M are outside of the opening 16, the robot R may be operated for positioning the sleeve in line with an inlet 278 for a used sleeve receiving container 280.

In FIG. 23, the workpiece 14 is shown in a horizontal position. Robotic technology is capable of moving the tool 10' to and from a workpiece, regardless of its orientation. Accordingly, the workpiece 14 may be vertically oriented or oriented at an angle somewhere between horizontal and vertical.

The preferred and alternative embodiments which have been illustrated and described, and the various other alternative embodiments which have been described, are presented to provide a better understanding of the invention, but by themselves are not to limit the scope of protection. The scope of protection is to be determined by the claims which follow, interpreted in accordance with established rules of patent claim interpretation.

What is claimed is:

1. A sleeve loader for facilitating installation of a split sleeve onto a small diameter portion of a mandrel which is located axially inwardly of a large diameter outer end portion of said mandrel, comprising:

a housing;

an elongated mandrel receiving passageway in said housing having an end opening through which the mandrel is inserted into and pulled out from the passageway, said mandrel receiving passageway being in part defined by a sleeve holder in said housing which is spaced axially inwardly of the end opening, said sleeve holder being expandable and contractible radially and including a central mandrel receiving opening surrounded by an end surface which is directed axially outwardly towards the end opening of the mandrel receiving passageway;

wherein in use an elongated split sleeve is inserted into the end opening of the mandrel receiving passageway, into a supported position on the end surface of the sleeve holder, and then the mandrel is inserted through the end opening and moved into the mandrel receiving passageway, to and through the split sleeve;

wherein the large diameter end portion of the mandrel is sized to expand the sleeve as it moves through the sleeve and to expand the sleeve holder as it moves through the sleeve holder, said mandrel receiving passageway being long enough to permit insertion of the mandrel into said passageway a sufficient distance to move the large end portion of the mandrel entirely through the split sleeve and place the split sleeve on the small diameter portion of the mandrel; and wherein after the sleeve is positioned on the small diameter portion of the mandrel the mandrel is withdrawn from the loader, and as the mandrel is being withdrawn from the mandrel receiving passageway the sleeve holder is again expanded radially by its contact with the large diameter end portion of the mandrel.

2. A sleeve loader according to claim 1, wherein the housing includes a tubular main body and said sleeve holder is a ring member positioned within the main body, said sleeve holder being divided axially into a plurality of segments, and an elastic band extending circumferentially about the sleeve holder, said elastic band holding the segments together to form the ring, and said elastic band allowing the segments to move radially outwardly and circumferentially apart as the large diameter end portion of the mandrel is moved through the central mandrel receiving opening.

3. A sleeve loader according to claim 2, comprising at least one spacer ring within said tubular main body, axially inwardly of the sleeve holder and at least one other spacer ring within said tubular main body axially outwardly of said sleeve holder, each spacer ring including a central opening which is a part of the mandrel receiving passageway, each said central opening being larger in diameter than the large diameter end portion of the mandrel.

4. A sleeve loader according to claim 3, wherein one of the spacer rings includes an end socket in which the sleeve holder is received, said end socket having an interior diameter that is larger than the exterior diameter of the sleeve holder, so as to provide, when the segments of the sleeve holder are in contact, an annular space about the sleeve holder into which the segments can move when the large diameter end portion of the mandrel is moved through the central mandrel receiving opening.

5. A sleeve loader according to claim 3, wherein the two spacer rings differ in length and said rings are interchangeable in position, for the purpose of changing the distance that the sleeve holder is spaced from the end opening of the mandrel receiving passageway.

6. A sleeve loader according to claim 2, wherein the housing includes a tubular main body and said sleeve holder is a ring member positioned within the main body, and at least one spacer ring is positioned in said tubular main body axially inwardly of the sleeve loader, and at least one additional spacer ring is positioned in the tubular main body axially outwardly of the sleeve holder, each spacer ring including a central opening which is a part of the mandrel receiving passageway, each said central opening being larger in diameter than the large diameter end portion of the mandrel, wherein the spacer rings differ in length and said spacer rings are interchangeable in position, for the purpose of changing the distance that the sleeve holder is spaced from the end opening in the mandrel receiving passageway.

7. A sleeve loader according to claim 6, wherein one of the spacer rings includes an end socket in which the sleeve holder is received, said end socket having an interior diameter that is larger than the exterior diameter of the sleeve holder, so as to provide, when the segments of the sleeve holder are in contact, an annular space about the sleeve holder into which the segments can move when the large diameter end portion of the mandrel is moved through the central mandrel receiving opening.

8. A sleeve loader according to claim wherein the housing includes a tubular main body and said sleeve holder is a ring member positioned within the main body, and said sleeve loader includes at least two spacer rings which differ in length, each spacer ring including a central opening which is a part of the mandrel receiving passageway, with the order of placement of the sleeve holder and the spacer rings within the housing being changeable for the purpose of changing the distance that the sleeve holder is spaced from the end opening in the mandrel receiving passageway.

9. A sleeve holder according to claim 8, wherein the sleeve holder is divided axially into a plurality of segments, and said sleeve loader includes bias means for biasing the segments together to form the ring, said bias means allowing the segments to move radially outwardly and circumferentially apart as the large diameter end portion of the mandrel is moved through the central mandrel receiving opening.

10. A sleeve loader according to claim 9, wherein one of the spacer rings includes an end socket in which the sleeve holder is received, said end socket having an interior diameter that is larger than the exterior diameter of the sleeve loader, so as to provide, when the segments of the sleeve holder are in contact, an annular space about the sleeve holder into which the segments can move when the large diameter end portion of the mandrel is moved through the central mandrel receiving opening.

11. A sleeve loader according to claim 1, for use with a puller tool which includes a nosepiece, wherein said mandrel extends axially outwardly from the nosepiece, said sleeve loader comprising a tubular entry member within the housing, including an outer nosepiece receiving portion adjacent and an inner mandrel receiving portion, said mandrel receiving portion including a central opening which is a part of the mandrel receiving passageway, said central opening being of a diameter to permit passage through it of the large diameter end portion of the mandrel, and said nosepiece receiving portion having a larger central opening which is of a diameter sufficient to receive and accommodate the nose portion of the puller gun, said nose portion of the puller gun being larger in diameter than said larger central opening in the mandrel receiving portion of the entry member.

12. A sleeve loader according to claim 11, wherein the entry member is movable axially within the housing, and said sleeve loader includes a spring biasing the entry member towards the end opening, wherein a placement of the mandrel within the mandrel receiving passageway, and the nosepiece within the nosepiece receiving portion of the entry member, and an endwise movement on the puller tool to move the mandrel through the split sleeve and the sleeve holder, will move the nosepiece against said entry member and said entry member against the spring and move the entry member axially into the housing.

13. A sleeve loader according to claim 1, further including a support for the sleeve loader connected to a user which positions the sleeve loader in convenient reach of the user, with the end opening of the mandrel receiving passageway directed upwardly.

14. A sleeve holder according to claim 13, wherein the support includes a user engaging strap, and a pocket secured to said strap, said housing being located within said pocket.

15. A sleeve loader according to claim 14, further comprising a sleeve holding pocket connected to said strap adjacent the pocket in which the housing is located.

16. A sleeve holder according to claim 15, comprising a second sleeve receiving pocket connected to said strap, wherein one of said sleeve receiving pocket holds used sleeves and the other for holds sleeves which have not yet been used.

17. A method of expanding an opening in a workpiece, comprising:
inserting an expandable split sleeve into a sleeve loader, onto an expandable sleeve holder within said sleeve loader;
picking up a puller tool which includes a nose portion having a workpiece contacting end surface and a mandrel which projects axially outwardly from said nose portion, said mandrel having an inner end within the puller tool, and in series from said inner end, a small diameter portion, an increasing diameter portion and a large diameter outer end portion;
moving the puller tool to place the mandrel within said sleeve loader;
moving the puller tool to in turn move the large diameter end portion of the mandrel first through the split sleeve, and then through the sleeve holder, to position the split sleeve on the small diameter portion of the mandrel and an end portion of the split sleeve within the nose portion of the puller tool;
moving the puller tool to withdraw the mandrel and sleeve out from the sleeve loader;
moving the puller tool to insert and mandrel and sleeve into an opening in a workpiece, to position the sleeve within the opening and position the workpiece contacting end surface of the nose portion against the workpiece;
operating the puller tool to pull the increasing diameter portion and the maximum outer end portion of the mandrel through the split sleeve, to expand the sleeve as they move through the sleeve and cause the sleeve to expand the opening in the workpiece;
gripping the sleeve by said nose portion; and
at the end of the pull of the mandrel through the sleeve, pulling the puller tool away from the workpiece, while maintaining the grip of the nose portion on the sleeve, so that such movement of the puller tool will pull the sleeve out from the opening in the workpiece.

18. The method of claim 17, comprising releasing the sleeve from the grip of the nose portion, following removal of the sleeve from the opening in the workpiece.

19. A method according to claim 18, wherein the nose portion of the puller tool is split axially into a plurality of fingers, and said fingers includes inwardly directed portions which engage and grip the sleeve, and said fingers are in the nature of spring members biased into gripping contact with the sleeve, and comprising releasing the grip of the fingers on the sleeve by forcing these fingers radially outwardly an amount sufficient to release the grip of the fingers on the sleeve, while directing the nose portion of the puller tool downwardly so that the sleeve can fall by gravity away from said nose portion.

20. Apparatus for cold expanding an opening in a workpiece, comprising:
a mandrel having, in series, an inner end portion, a small diameter portion, an increasing diameter portion, and a maximum diameter portion, said maximum diameter portion being fittable through the opening in the workpiece;
an expandable split sleeve positionable on the small diameter portion of the mandrel, and while on said small diameter portion of the mandrel having an outside diameter which is fittable through the opening in the workpiece, said sleeve also including a sleeve end; and
a puller tool including,
a housing,
an extendable/retractable piston within said housing, said inner end portion of the mandrel being connected to said piston, so that extension and retraction of the piston will extend and retract the mandrel;
an elongated, expandable sleeve holder having a central passageway in which the mandrel is received said sleeve holder having a sleeve end contacting outer end and an inner end within said housing, an elongated, axially split, expandable nosepiece surrounding said sleeve holder, said nosepiece comprising a plurality of axially extending fingers separated by axially extending splits, said fingers including outer end portions which extend axially outwardly from the sleeve end contacting end surface of the sleeve holder, said outer end portions of said fingers including workpiece contacting end surfaces, and together defining a sleeve receiving space, wherein in use, the split sleeve is installed onto the small diameter portion of the mandrel when the mandrel is extended, and is moved along the mandrel into the sleeve receiving space in the nosepiece to place said sleeve end against the sleeve end contacting outer end of the sleeve holder, and then the mandrel and sleeve are inserted into the workpiece opening and are moved endwise to position the split sleeve in the workpiece opening and the workpiece contacting surface of the nosepiece into contact with the workpiece, and then the piston is retracted to retract the mandrel and pull it completely through the split sleeve, with movement of the increasing diameter and maximum diameter portions of the mandrel through the split sleeve causing the split sleeve to expand radially and exert a radially outwardly directed force on material immediately surrounding the workpiece opening, for expanding the workpiece opening, and said outer end portions of the fingers having radially inwardly directed grip surfaces outwardly bound the sleeve receiving space in the nosepiece, said grip surfaces gripping the split sleeve and, at the end of cold expansion, when the mandrel is retracted, the grip surfaces hold onto the split sleeve while the puller tool and mandrel are moved away from the workpiece, so that such movement of the puller tool and mandrel will pull the split sleeve out from the opening in the workpiece.

21. Apparatus according to claim 20, wherein said nosepiece fingers are in the nature of leaf springs which normally bias the grip surfaces of the fingers into gripping contact with the split sleeve.

22. Apparatus according to claim 21, wherein said nosepiece fingers include inwardly directed cam surfaces, and said sleeve holder is movable axially outwardly against said cam surfaces, and said puller tool includes controllable means for moving said sleeve holder axially outwardly, said sleeve holder in response to such movement contacting the cam surfaces on the nosepiece fingers and exerting a radially outwardly directed force on the nosepiece fingers, moving the grip surfaces out of gripping engagement with the sleeve.

23. In a puller tool which pulls a tapered mandrel through a split sleeve while the split sleeve is located within an opening in a workpiece, for expanding the split sleeve against workpiece material surrounding the opening, to in that manner compress said material and expand the opening:

an elongated, axially split, expandable sleeve holder having a central passageway in which the mandrel is received, said sleeve holder having a sleeve end contacting outer end;

an elongated, axially split, expandable nosepiece surrounding said sleeve holder, said nosepiece comprising a plurality of axially extending fingers separated by axially extending splits, said fingers including outer end portions which extend axially outwardly from the sleeve end contacting end surface of the sleeve holder, said outer end portions of said fingers including workpiece contacting end surfaces, said outer end portions of said fingers together defining a sleeve receiving space, and said outer end portions of the fingers having radially inwardly directed grip surfaces which surround the sleeve receiving space;

wherein in use an end portion of a split sleeve is placed in the sleeve receiving end space, and in contact with the sleeve end contacting end surface of the sleeve holder; and wherein the fingers are in the nature of leaf springs and said fingers normally bias the grip surfaces into contact with the split sleeve, so that the sleeve will be gripped by the nosepiece and following movement of the mandrel through the sleeve, a movement of the puller tool away from the workpiece will pull the split sleeve out from the opening in the workpiece.

24. A puller tool according to claim 23, including means operable following movement of the puller tool away from the workpiece, to move the fingers radially outwardly to release the grip surfaces from the split sleeve, so that the split sleeve can be removed from the tool.

25. Apparatus for expanding an opening in a workpiece, comprising:

a sleeve loader including a housing, a mandrel receiving passageway in said housing having an end opening, a sleeve support within said housing spaced axially inwardly of the end opening, said sleeve support being expandable and retractable radially and including a central mandrel receiving opening surrounded by an end surface which is directed outwardly towards the end opening of the mandrel receiving passageway;

an expandable split sleeve positionable in said sleeve loader, with its inner end against the end surface of the sleeve support;

a puller tool including an expandable sleeve holder having a central passageway, said sleeve holder having a sleeve end contacting outer end, and an elongated, axially split, expandable nosepiece surrounding said sleeve holder, said nosepiece comprising a plurality of axially extending fingers separated by axially extending splits, said fingers including outer end portions which extend axially outwardly from the sleeve end contacting end surface of the sleeve holder, said outer end portions of said fingers including workpiece contacting end surfaces, said outer end portions of said fingers together defining a sleeve receiving space, and said outer end portions of the fingers having radially inwardly directed grip surfaces which surround the sleeve receiving space;

an elongated mandrel within the central passageway in the sleeve holder, said mandrel having an inner end, a small diameter portion extending axially outwardly from the inner end, an increasing diameter portion extending axially out from the small diameter portion, and a large diameter portion extending axially outwardly from the increasing diameter portion; and drive means within the puller tool for extending and retracting the mandrel, wherein when the mandrel is extended it can be inserted into the sleeve loader and pushed through the sleeve and the sleeve support until the sleeve is on the small diameter portion of the mandrel and an end portion of the sleeve is within the sleeve space, and then the mandrel can be withdrawn out from the sleeve loader and inserted into an opening in a workpiece, and moved to place the sleeve within the opening in the workpiece and the workpiece contacting end of the nosepiece against the nosepiece, and then the drive means of the puller tool can be operated to retract the mandrel and pull the increasing diameter portion and the large diameter portion of the mandrel through the sleeve, and wherein the fingers of the nosepiece will hold the grip surfaces of said fingers into gripping contact with the split sleeve, so that following movement of the mandrel through the sleeve, a movement of the puller tool away from the workpiece will pull the split sleeve out from the opening in the workpiece.

26. Apparatus according to claim 25, wherein the puller tool includes means for moving the fingers of the nosepiece radially outwardly to release the grip of the grip surfaces on the sleeve, permitting the sleeve to move out from the sleeve space and become separated from the nosepiece.

27. For use with a mandrel having a small diameter portion inwardly of a larger diameter end portion, a sleeve loader for supporting a sleeve while the mandrel is extended through the sleeve, to position the sleeve on the small diameter portion of the mandrel, said sleeve loader comprising:

a housing having an end opening;

a sleeve abutment within said housing, said sleeve abutment including a mandrel receiving passageway having an outer end and a sleeve supporting surface immediately surrounding the outer end of said passageway, and spaced axially inwardly from the end opening of the housing, said sleeve abutment being radially expandable while supporting the sleeve, wherein in use a sleeve is introduced into the sleeve loader through said end opening and moved into contact with the sleeve supporting surface, and the large diameter end portion of the mandrel is then inserted into the end opening and through the supported sleeve, and then through the mandrel passageway in the sleeve abutment, and is moved until the large diameter end portion of the mandrel is entirely through the sleeve and the sleeve is positioned on the small diameter portion of the mandrel, and then the mandrel, with sleeve installed, is pulled out from the sleeve holder.

* * * * *

UNITED STATES PATENT AND TRADEMARK OFFICE
CERTIFICATE OF CORRECTION

PATENT NO. : 5,127,254
DATED : July 7, 1992
INVENTOR(S) : Charles M. Copple, Michael A. Landy, Richard Jarzebowicz, Leonard F. Reid, Eric T. Easterbrook and Mark Weiss It is certified that error appears in the above-identified patent and that said Letters Patent is hereby corrected as shown below:

Column 2, line 6, there is a period after "opening".
Column 2, line 26, "Jan. 17, 1984," should be -- Jan. 17, 1984. --.
Column 5, line 24, before "shows", insert -- and --.
Column 5, line 54, delete "and".
Column 6, line 19, there is a period after "loader 24".
Column 6, line 40, there is a period after "flat surface".
Column 6, line 53, "Fig. 1" should be -- Fig. 11 --.
Column 7, line 2, there is a period after "fingers 64".
Column 7, lines 9 and 10, "(Fig. 14). On" should be
    -- (Fig. 14) on --
Column 7, line 43, there is a period after "housing 28".
Column 7, line 48, there is a period after "housing 28".
Column 7, line 61, "look" should be -- lock --.
Column 8, line 22, there is a period after "portion 134".
Column 9, line 41, there is a period after "split".
Column 10, line 10, there is a period after "opening 94".
Column 12, line 7, there is a period after "sockets".
Column 12, line 30, there is a period after "opening 232".
Column 14, line 26, "puller tool 10," should be -- puller
    tool 10' --.

UNITED STATES PATENT AND TRADEMARK OFFICE
CERTIFICATE OF CORRECTION

PATENT NO. : 5,127,254

DATED : July 7, 1992

INVENTOR(S) : Charles M. Copple, Michael A. Landy, Richard Jarzebowicz, Leonard F. Reid, Eric T. Easterbrook and Mark Weiss It is certified that error appears in the above-identified patent and that said Letters Patent is hereby corrected as shown below:

Column 14, line 43, there is a period after "opening 94".
Claim 8, column 16, line 50, "claim" should be -- claim 1 --.
Claim 16, column 17, line 56, "pocket" should be -- pockets --;
    and in line 57, delete "for".
Claim 17, col. 18, line 14, "insert and" should be --insert the--.
Claim 19, col. 18, line 37, "includes" should be -- include --.
Claim 20, col. 18, line 68, "received" should be --received, --.

Signed and Sealed this

Nineteenth Day of October, 1993

Attest:

BRUCE LEHMAN

*Attesting Officer*　　　　*Commissioner of Patents and Trademarks*